(12) United States Patent
Jannarone

(10) Patent No.: US 6,289,330 B1
(45) Date of Patent: Sep. 11, 2001

(54) CONCURRENT LEARNING AND PERFORMANCE INFORMATION PROCESSING SYSTEM

(75) Inventor: Robert Jannarone, Atlanta, GA (US)

(73) Assignee: Netuitive, Inc., Alpharetta, GA (US)

( * ) Notice: Subject to any disclaimer, the term of this patent is extended or adjusted under 35 U.S.C. 154(b) by 0 days.

(21) Appl. No.: 09/137,265

(22) Filed: Aug. 20, 1998

Related U.S. Application Data

(63) Continuation-in-part of application No. 08/333,204, filed on Nov. 2, 1994.

(51) Int. Cl.[7] .................................................. G06F 15/18
(52) U.S. Cl. ............................... 706/26; 706/25; 706/27
(58) Field of Search .................................. 706/25, 26, 27

(56) References Cited

U.S. PATENT DOCUMENTS

| | | | |
|---|---|---|---|
| 4,875,183 | * 10/1989 | Graf et al. | 706/38 |
| 4,903,226 | * 2/1990 | Tsividis | 706/33 |
| 5,087,826 | * 2/1992 | Holler et al. | 706/33 |
| 5,148,514 | * 9/1992 | Arima et al. | 706/25 |
| 5,151,969 | * 9/1992 | Petsche | 706/26 |
| 5,157,738 | * 10/1992 | Carpenter et al. | 706/25 |
| 5,195,170 | * 3/1993 | Eberhardt | 706/25 |
| 5,214,743 | * 5/1993 | Asai et al. | 706/31 |
| 5,220,202 | * 6/1993 | Isono et al. | 706/38 |
| 5,222,194 | * 6/1993 | Nishimura | 706/25 |

(List continued on next page.)

OTHER PUBLICATIONS

Takefuji et al.; "Multinomial Conjunctoid Statistical Learning Machines". IEEE[online], Conference Proceedings of the 15th Annual International Symposium on Computer Architecture, May–1998, pp 12–17.*

Ma et al; "An Assessment of Conjunctoid Theory and Its Potential Utility". IEEE[online], Proceedings of the IEEE Southeastcon 1990, Apr.–1990, vol. 2, pp 485–488.*

Mallya et al.; "Real–time Pattern Recognition I: Neural Network Algorithms for Normal Models". IEEE[online], Proceedings of the 23rd Annual Southeastern Symposium on System Theory, 1991, Mar.–1991, pp. 580–583.*

Bartczak, A.; "Towards Extending Adaptive Self–Organizing Concurrent System Architecture". IEEE[online], Proceedings of the 1994 International Symposium on Speech, Image Processing and Neural Networks, vol. 1, Apr.–1994, pp. 89–94.*

Chen et al.; "Design of Adaptive and Incremental Feed–forward Neural Networks". IEEE International Conference on Neural Networks, vol. 1, Mar.–1993, pp. 479–484.*

*Primary Examiner*—Mark P. Powell
*Assistant Examiner*—Kelvin Booker
(74) *Attorney, Agent, or Firm*—Michael J. Mehrman; Gardner Groff Mehrman & Josephic, P.C.

(57) ABSTRACT

The present invention provides a system for learning from and responding to regularly arriving information at once by quickly combining prior information with concurrent trial information to produce useful learned information. A parallel embodiment of the system performs can perform updating operations for memory elements of matrix through the coordinated use of parallel feature processors and a joint access memory, which contains weighted values and provision for connecting feature processors pairwise. The parallel version also performs feature function monitoring, interpretation and refinement operations promptly and in concert with concurrent operation. A non-parallel embodiment of the system uses a single processor to perform the above operations however, more slowly than the parallel embodiment, yet faster than available alternatives.

60 Claims, 20 Drawing Sheets

U.S. PATENT DOCUMENTS

| | | | | |
|---|---|---|---|---|
| 5,243,688 | * | 9/1993 | Pechanek et al. | 706/42 |
| 5,253,327 | * | 10/1993 | Yoshihara | 706/25 |
| 5,402,522 | * | 3/1995 | Alkon et al. | 706/26 |
| 5,408,588 | * | 4/1995 | Ulug | 706/25 |
| 5,430,830 | * | 7/1995 | Frank et al. | 706/25 |
| 5,448,684 | * | 9/1995 | Holt | 706/25 |
| 5,461,696 | * | 10/1995 | Frank et al. | 704/232 |
| 5,479,575 | * | 12/1995 | Yoda | 706/25 |
| 5,517,600 | * | 5/1996 | Shimokawa | 706/15 |
| 5,701,398 | * | 12/1997 | Glier et al. | 706/26 |
| 5,796,920 | * | 8/1998 | Hyland | 706/20 |
| 5,835,902 | * | 11/1998 | Jannarone | 706/26 |

* cited by examiner t     FETCH ω(16,15) TO FEATURE PROCESSOR 16 AND 15
t+1    FETCH e [IN] (15) TO FEATURE PROCESSOR 16
t+2    FETCH e [IN] (16) TO FEATURE PROCESSOR 15 t     FETCH x (15) TO FEATURE PROCESSOR 16
t+1    FETCH ω[IN] (16,15) TO FEATURE PROCESSOR 16
t+2    FETCH ω[OUT] (16,15) TO NODE M(16,15)

CONCURRENT LEARNING AND PERFORMANCE INFORMATION PROCESSING SYSTEM

REFERENCE TO RELATED PATENT APPLICATION

The present application is a continuation-in-part of U.S. patent application Ser. No. 08/333,204 filed on Nov. 2, 1994.

FIELD OF INVENTION

Generally, the present invention relates to the field of parallel processing neurocomputing systems and more particularly to real-time parallel processing in which learning and performance occur durling a sequence of measurement trials.

BACKGROUND

Conventional statistics software and conventional neural network software identify input-output relationships during a training phase, and each apply the learned input-output relationships during a performance phase. For example, during the training phase a neural network adjusts connection weights until known target output values are produced from known input values. During the performance phase, the neural network uses connection weights identified during the training phase to impute unknown output values from known input values.

A conventional neural network consists of simple interconnected processing elements. The basic operation of each processing element is the transformation of its input signals to a useful output signal. Each interconnection transmits signals from one element to another element, with a relative effect on the output signal that depends oil the weight for the particular interconnection. A conventional neural network may be trained by providing known input values and output values to the network, which causes the interconnection weights to be changed.

A variety of conventional neural network learning methods and models have been developed for massively parallel processing. Among these methods and models, back propagation is the most widely used learning method and the multi-layer perceptron is the most widely used model. Multi-layer perceptrons have two or more processing element layers, most commonly an input layer, a single hidden layer and an output layer. The hidden layer contains processing elements that enable conventional neural networks to identify nonlinear input-output relationships.

Conventional neural network learning and performing operations can be performed quickly during each respective stage, because neural network processing elements can perform in parallel. Conventional neural network accuracy depends on data predictability and network structure that are pre-specified by the user, including the number of layers and the number of processing elements in each layer.

Conventional neural network learning occurs when a set of training records is imposed on the network, with each such record containing fixed input and output values. The network uses each record to update the network's learning by first computing network outputs as a function of the record inputs along with connection weights and other parameters that have been learned up to that point. The weights are then adjusted depending on the closeness of the computed output values to the training record output values. For example, suppose that a trained output value is 1.0 and the network computed value is 0.4. The network error will be 0.6 (1.0−0.4=0.6), which will be used to determine the weight adjustments necessary for minimizing the error. Training occurs by adjusting weights in the same way until all such training records have been used, after which the process is repeated until all error values have been sufficiently reduced.

Conventional neural network training and performance phases differ in two basic ways. While weight values change during training to decrease errors between training and computed outputs, weight values are fixed during the performance phase. Additionally, output values are known during the training phase, but output values can only be predicted during the performance phase. The predicted output values are a function of performance phase input values and connection weight values that were learned during the training phase.

While input-output relationship identification through conventional statistical analysis and neural network analysis may be satisfactory for some applications, both Such approaches have limited utility in other applications. Effective manual data analysis requires extensive training and experience, along with time-consuming effort. Conventional neural network analysis requires less training and effort, although the results produced by conventional neural networks are less reliable and harder to interpret than manual results.

A deficiency of both conventional statistics methods and conventional neural network methods results from the distinct training and performance phases implemented by each method. Requiring two distinct phases causes considerable learning time to be spent before performance can begin. Training delays occur in manual statistics methods because even trained expert analysis takes considerable time, and training delays occur in neural network methods because many training passes through numerous training records are needed. Thus, conventional statistical analysis is limited to settings where (a) delays are acceptable between the time learning occurs and the time learned models are used, and (b) input-output relationships are stable between the time training analysis begins and performance operations begin.

Thus, there is a need in the art for an information processing system that may operate quickly to either learn or perform or both within a time trial.

SUMMARY OF THE INVENTION

Generally described, the present invention provides a data analysis system that receives measured input values for variables during a time trial and learns relationships among the variables gradually by improving learned relationships from trial to trial. Additionally, in some embodiments if any input values are missing, the present invention provides, during the time trial, an (imputed) output value for the missing value that are based on the prior learned relationships among the analyzed variables.

More particularly, an embodiment of the present invention may provide the imputed values by implementing a mathematical regression analysis of feature values that are functions of the input values. The regression analysis may be performed by utilizing a matrix of connection weights to predict each feature value as a weighted sum of other feature values. Connection weight elements are updated during each trial to reflect new connection weight information from trial input measurements. Also, a component learning weight is also utilized during each trial that determines the amount of impact that the input measurement vector has on learning relative to prior vectors received.

Embodiments of the present invention may process the input values in parallel or process the values sequentially. The different input values may be provided in the form of vectors. Each of the values of the input feature vector is operated on individually with respect to prior learned parameters. In the parallel embodiment, a plurality of processors process the input values, with each processor dedicated to receive a specific input value from the vector. That is, if the system is set up to receive sixteen input feature values (i.e., corresponding to a vector of length sixteen), sixteen processing units are used to process each of the input feature values. In the sequential embodiment, one processor is provided to successively process each of the input feature values.

In a parallel embodiment of the present invention, each of the processing units is operative to receive, during a time trial, individual input values from an input vector. A plurality of conductors connect each of the processing units to every other processing unit of the system. The conductors transfer weighted values among each of the processor units according to processes of the present invention. Each of the processing units provide, during the time trial, an imputed output value based upon the weighted values. Also, during the same time trial, each of the processing units is operative to update connection weights for computing the weighted values based on the input values received.

Due to the limited number of outputs that a particular processor may drive, when interconnecting many processing units in parallel for the processing of data, the number of processing units that may be interconnected or driven by a single processing unit can be substantially limited. However, the present invention provides a plurality of switching junctions located along the conductors for interconnecting the processors to alleviate the problem associated with a single processor communicating with many others. The switching junctions are operable for uniquely pairing each of the processors to every other processor of the system.

Additionally, in embodiments of the present invention, output values and learned values may be evaluated and controlled by controller units within the information processing system. A learning weight controller may be provided that automatically adjusts the learning weight from trial to trial in a manner that generally regulates the relative effect that each input vector has on prior learning. Additionally, a user may interface with the system to provide desired learning weights different than the learning weights that may be automatically provided by the system. Also, the present invention may provide a feature function controller that is operative to convert measurement values initially received by the system to input feature vectors for imputing and learning use by the system. The feature function controller is also operative to either provide default initial connection weights or receive connection weight elements externally so that a user of the system may supply initial weights as desired.

While the above embodiments of the present invention are advantageous in updating connection weights in neural network type applications, alternative operations of the system include: (1) updating a coefficient matrix that is used by the Davidon-Fletcher-Powell (DFP) numerical optimization algorithm; (2) multiplying a symmetric matrix by a vector; and (3) adjusting the connection weight matrix for deleted features during feature function control.

With respect to the numerical optimization application, the DFP method is one of several iterative methods for finding the maximum (or minimum) independent variable values for a function of several variables. Numerical optimization methods are generally useful but are also generally slow. For example, numerical optimization methods are used to find optimum values associated with five-day weather forecasts, but generally take many hours to converge, even on supercomputers. Among the numerical optimization methods, the DFP is especially useful in a variety of applications, because the DFP method learns derivative information during the iterative search process that may not be readily available.

Just as the parallel system process is used to implement a fast concurrent information processing system, a modified version of is used for a fast new numerical optimization system. The DFP method continuously updates the inverse of a matrix as part of normal operation. Instead of updating the inverse of a covariance matrix as in the CIP system, the DFP algorithm updates the inverse of an estimated matrix of second-order derivatives, which is called the information matrix. Although the formula for updating the DFP inverse is distinct from the formula for updating the CIP inverse, an extension to the parallel CIP system algorithm can be used for DFP updating.

The present invention also includes a less computationally involved embodiment that may be implemented where multiplication of a symmetric matrix by a vector is performed repeatedly and quickly. The parallel system embodiment may be simplified to compute Such products, by preserving only operations that are needed to compute Such products and removing all others. As, with the parallel CIP system embodiment and all other tailored versions, using parallel processing instead of sequential processing will produce results that are faster.

Thus, it is an object of the present to provide an information processing system that provides accurate learning based on input values received.

It is a further object of the present invention to convert input measurement values to input feature values during a single time trial.

It is a further object of the present invention to provide learning and performance (measurement and feature value imputing) during a single time trial.

It is a further object of the present invention to impute missing values from non-missing values.

It is a further object of the present invention to identify unusual input feature deviations.

It is a further object of the present invention to provide a system for learning and performing quickly during a single time trial.

It is a further object of the present invention to identify sudden changes in input feature values.

It is a further object of the present invention to provide a system for quickly processing input feature values in parallel.

It is a further object of the present invention to provide a system for quickly processing input feature values sequentially.

It is a further object of the present invention to provide a system that enables multiple parallel processing units to communicate among each of the processing units of the system quickly.

It is a further object of the present invention to provide a system that enables multiple parallel processing units to be accessed in pairs.

It is a further object of the present invention to provide communication between paired processors in a minimal number of steps.

It is a further object of the present invention to provide processes that accomplish the above objectives.

These and other objects, features, and advantages of the present invention will become apparent from reading the following description in conjunction with the accompanying drawings.

DETAILED DESCRIPTION

OPERATIONAL OVERVIEW

Figure 1:
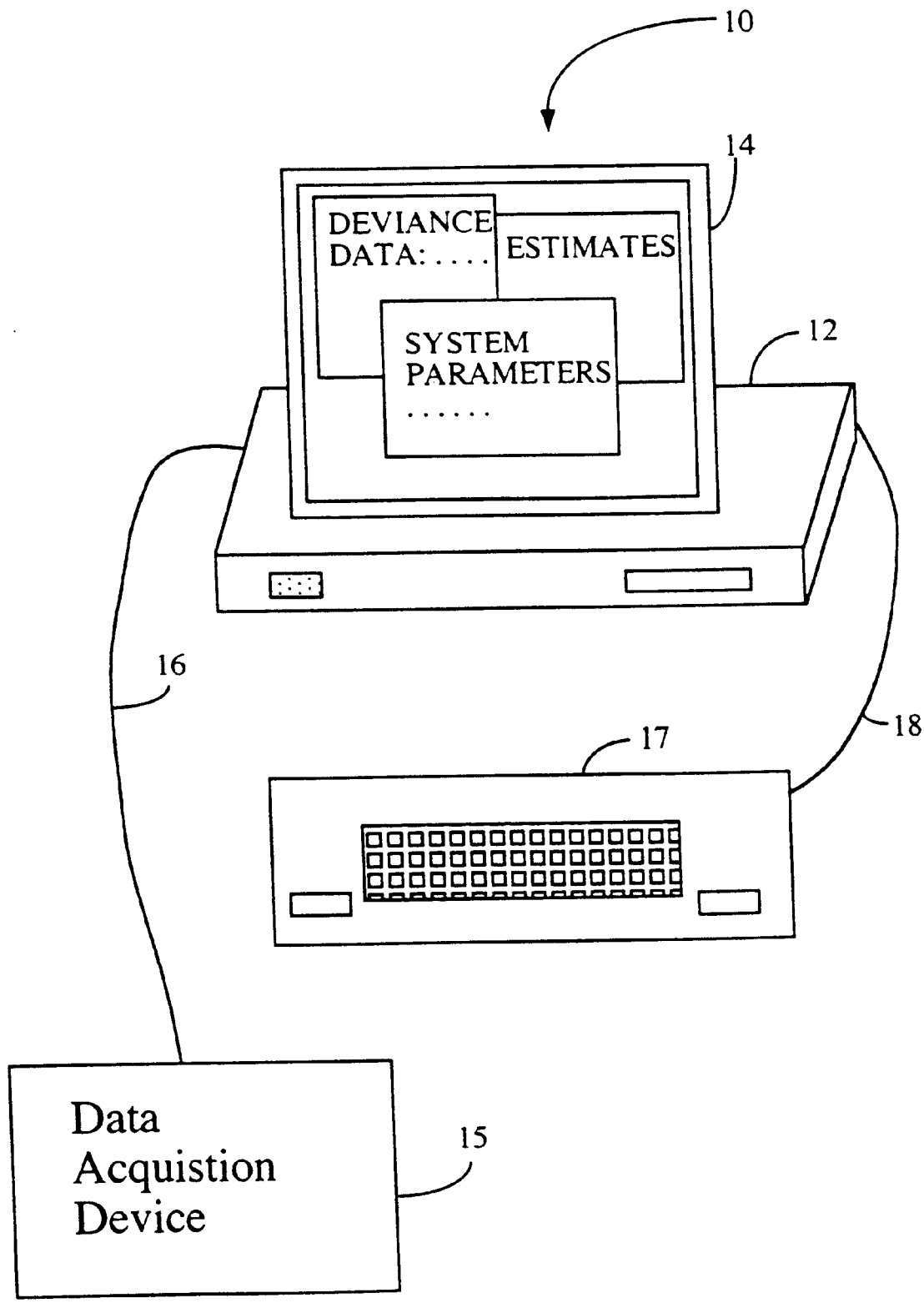
FIG. 1 illustrates the preferred embodiment of the present invention.

Referring to the figures, in which like numerals refer to like parts throughout the several views, a concurrent learning and performance information processing (CIP) neurocomputing system made according to the preferred embodiment of the present invention is shown. Related U.S. patent application Ser. No. 08/333,204 is incorporated herein by reference. Referring to FIG. 1, a CIP system 10 is implemented with a computer 12 connected to a display monitor 14. The computer 12 of the CIP system 10 receives data for evaluation from a data acquisition device (DAD) 15, which may provide multiple measurement values at time points via a connection line 16. Data acquisition devices such as data acquisition computer boards and related software are commercially available from companies such as National Instruments Corporation. The computer 12 may also receive input data and/or operation specifications from a conventional keypad 17 via an input line 18. Receiving and responding to a set of input measurement values at a time point is referred to herein as a trial, and the set of input values is referred to herein as a measurement record.

Generally, when the CIP system 10 receives an input measurement record, the system determines (learns) the relationships that exist among the measurements received during the trials. If some measurement valves are missing during the trial, the CIP system 10 provides imputed values that would be expected based on the prior learned relationships among prior measurements along with the non-missing current measurement values.

The CIP system 10 receives a measurement record from the data acquisition device 15 and converts the measurement values to feature values. The conversation of measurement values to feature values operates to reduce the number of learned parameters that are needed for learning or imputing. The feature values and other values calculated from the feature values provide useful data for predicting or imputing values when certain measurement values are missing or for determining that a monitored measurement value of a system has abnormally deviated from prior measurement values.

Upon receiving an input measurement record at the beginning of a trial, the CIP system 10 performs the following operations as quickly as each input record arrives (i.e., system 10 performs concurrently): deriving input feature values from incoming measurement values (concurrent data reduction); identifying unusual input feature values or trends (concurrent monitoring); estimating (i.e., imputing) missing feature values (concurrent decision-making); and updating learned feature and means, learned feature variances and learned interconnection weights between features (concurrent learning).

The CIP system is useful in many applications, such as continuous and adaptive: (a) instrument monitoring in a chemically or radioactively hostile environment; (b) on-board satellite measurement monitoring; (c) missile tracking during unexpected excursions; (d) in-patient treatment monitoring; and (e) monitoring as well as forecasting competitor pricing tactics. In some applications high speed is less critical than in others. As a result, the CIP system has provision for either embodiment on conventional (i.e., sequential) computers or embodiment on faster parallel hardware.

Although speed is not a major concern in some applications, CIP high speed is an advantage for broad utility. Sequential CIP embodiment is faster than conventional statistics counterparts for two reasons: first, the CIP system uses concurrent updating instead of off-line training; second, the CIP system updates the inverse of a certain covariance matrix directly, instead of the conventional statistics practice of computing the covariance matrix first and then inverting the covariance matrix. Concurrent matrix inverse updating allows for fast CIP implementation. When implemented using a sequential process, CIP response time increases as the square of the number of data features utilized increases. However, when implemented using a parallel process, CIP response time increases only as the number of features utilized increases. In the parallel system, a processor is provided for each feature. As a result, parallel CIP response time is faster than sequential CIP response time by a factor of the number of features utilized.

PARALLEL SYSTEM OVERVIEW

Figure 2:
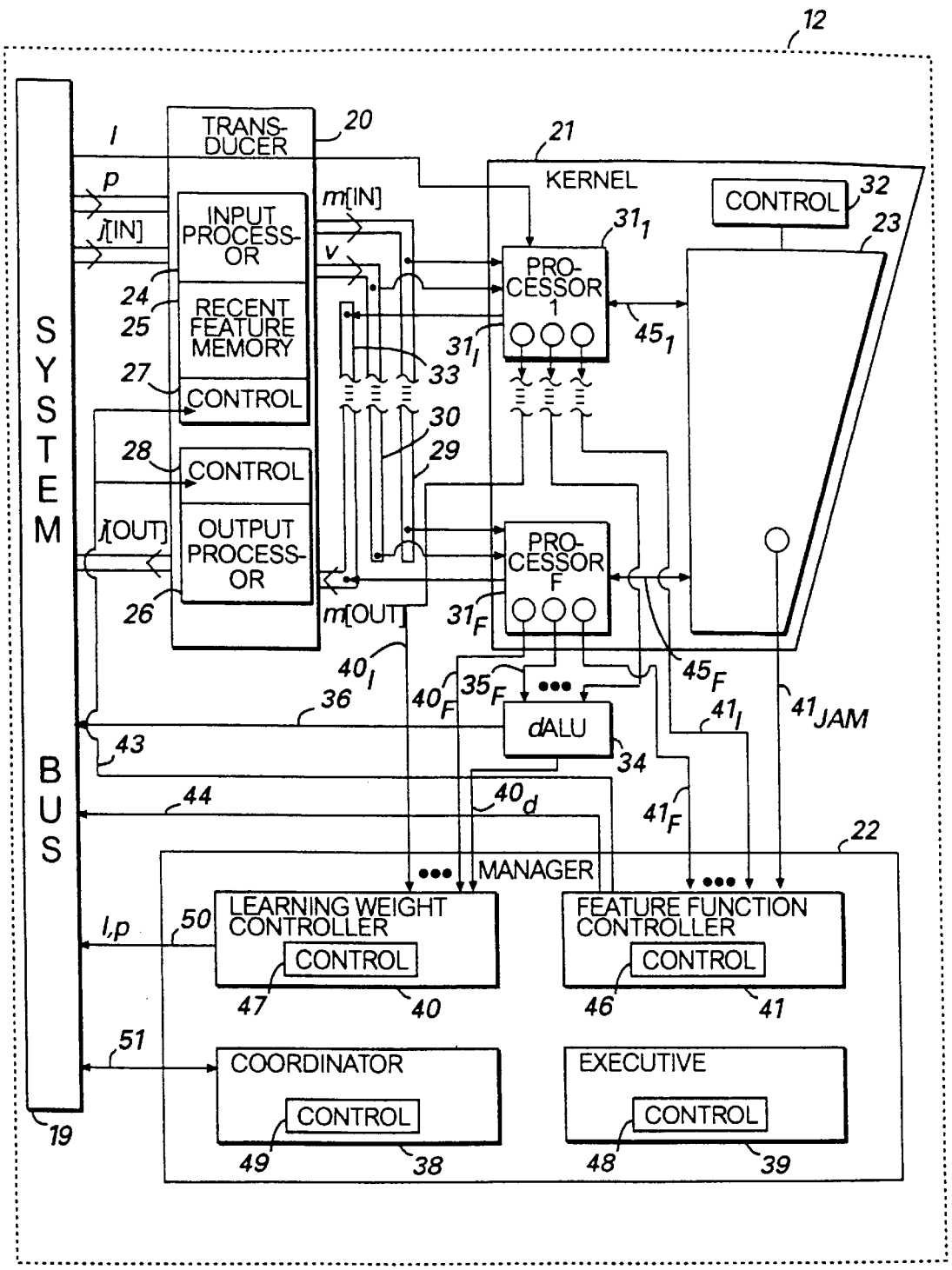
FIG. 2 is a block diagram that illustrates a parallel processor embodiment of the preferred embodiment of the present invention.

Referring to FIG. 2, a parallel embodiments of the basic subsystems of the CIP system 10 is shown. Before discussing subsystem details, an operational CIP overview will be discussed with reference to FIG. 2. The CIP subsystems include a system bus 19, a transducer 20, a kernel 21 and a manager 22. The transducer 20 and the kernel 21 operate successively in order to accomplish the various concurrent operations described above. Input measurement values are first converted to input feature values by the transducer 20. The input features are then processed by the kernel 21 to produce imputed (i.e., output) features, updated learned parameters and monitoring statistics. Output feature values are then converted to imputed (i.e. output) measurement values by the transducer 20. The manager 22 coordinates transducer 20 and kernel 21 concurrent operations and occasionally refines system operation.

The basic components of the transducer 20 are an input processor 24 that has a recent feature memory (RFM) 25 and an output processor 26. The input processor 24 and output processor 26 are each controlled by input and output control units 27 and 28, respectively. The recent feature memory 25 stores a preselected number of input feature values m[IN], obtained from prior trials (all vectors in this document are row vectors). The stored recent features may be utilized in conjunction with input measurements j[IN] to calculate, as discussed below, concurrent input feature values m[IN] for the current trial. At the beginning of each trial, the input processor 24 receives an input measurement vector j[IN] and a corresponding plausibility vector p. Plausibility vector elements identify input measurement vector elements as non-missing or missing.

The input processor 24 then (a) converts the input vector j[IN] to some input features and combines those converted input features with other converted features in the recent feature memory 25 to produce a resulting input feature vector in[IN]; and (b) converts the plausibility vector p to a corresponding viability vector v. Similar to the plausibility vector, the viability vector elements identify input feature vector elements as non-missing or missing. At the end of each trail, the output processor 26 receives an output feature vector m[OUT]. The output processor 26 converts the output feature vector m[OUT] to a corresponding output measurement vector j[OUT].

The input measurement vector j[IN] received by the transducer input processor 24 contains the values of the input measurement vectors from the DAD 15 (shown in FIG. 1). Plausibility values, provided either externally by the DAD 15 or internally by the manager 22, indicate if a measurement plausibility value is 0 (missing), 1 (non-missing) or some intermediate value (a combination of missing and non-missing quantum values as discussed below). If an element of j[IN] is missing, as determined by the corresponding element of p being 0, then the corresponding element of J[OUT] is imputed, based on non-missing elements of j[IN] and/or previously learned information. The imputing process utilizes measurement to feature conversion within the transducer input processor 24, followed by missing feature value imputing within the kernel, followed by imputed feature to imputed measurement conversion within the transducer output processor 26.

Prior to concurrent operation, the transducer input processor 24 computes feature values and viability values according to functions that are determined by the manager 22. Each feature element in m[IN] is a function of the measurement elements in j[IN], and each viability element of v is a corresponding function of the plausibility elements in p. For example, the first feature function in n[IN] could be the sum, m[IN](1)=j[IN](1)+j[IN](2), and the second feature function in m[IN] could be the product, m[IN](2)=j[IN](1) j[IN](3). Each feature viability value is the product among the plausibility values for the measurements that are independent variables in the feature function. For example, if the plausibility values for the above three measurement functions are p(1)=1.0, p(2)=0.5 and p(3)=0.0, then the two above feature viability values will be v(1)=1.0×0.5=0.5, and v(2)=0.5×0.0=0.0.

Feature viability elements are computed as products of corresponding measurement plausibility elements. Every CIP system input measurement value is treated as an average of non-missing quantum measurement values from a larger set, some of which may be missing. The corresponding plausibility value of each input measurement is further treated as the proportion of component quanta that are non-missing within the larger set. From probability theory, if an additive or product composite feature function is made up of several such input measurements and if the distributions of missing quanta are independent between measurements, the expected proportion of terms in the composite for which all quantum measurements are non-missing is the product of the component measurement plausibility values. Since feature viability values within the CIP system have this expected proportion interpretation, the feature viability values are computed as products of component measurement plausibility values.

After input measurement values j[IN] and plausibility values p have been converted to input feature vectors m[IN] and viability values v by the transducer input processor 24, the kernel 21 begins the next within-trial operation. Inputs to the kernel 21 include resulting feature values within n[IN], corresponding viability values within v and an input learning weight l. The kernel 21 includes: a processor $31_1$ for feature 1 through processor $31_F$ for feature $_F$; a kernel control module 32; and a joint access memory (JAM) 23 connected by buses 45 through $45_F$, to the processors 31 through $31_F$. Outputs from the kernel 21 include imputed feature values in m[OUT], feature function monitoring statistics that are sent to the manager via connections $41_F$, through $41_F$ and $41_{JAM}$, and feature value monitoring statistics that are sent to the manager via connections $40_1$, through $40_F$. The kernel processors $31_1$ through $31_F$ use preferably arithmetic logic units (ALUs) that implement basic arithmetic functions, in order to reduce the cost and size of the processors $31_1$ through $31_F$. As known to those skilled in the art, basic processors as such may be designed using commercially available chip design software packages, such as Mentor Graphics®, a product of the Mentor Graphics Corporation.

Kernel processors $31_F$, through $31_F$ operate to: impute missing feature values based on non-missing elements of m[IN] and/or previously learned kernel 21 parameters; update learned parameters that reside in each processor and in the joint access memory 23; and produce monitoring statistics for use by the manager 22. As explained in more detail below, the kernel processors $31_1$ through $31_F$ utilize two steps of inter-processor communication to transfer relevant values from each processor to every other processor.

Kernel processor operations also compute a distance measure d in the kernel distance ALU 34. Communication between the distance ALU 34 and each kernel processor occur through connections 351 through 35$_F$.

The kernel input learning weight l is a non-negative number that—like input plausibility values and viability values—is a quantum/probabilistic measure. The learning weight l for each trial is treated by the CIP system as a ratio of quantum counts, the numerator of which is the number of quantum measurement vectors for the concurrent trial, and the denominator of which is the total of all quantum measurements that have been used in prior learning. Thus, if the concurrent input feature vector m[IN] has a high learning weight l value, the input feature vector will have a larger impact on learned parameter updating than if the input feature vector has a lower learning weight l value, because the input feature vector in[IN] will contain a higher proportion of the resulting plausible quantum measurement total. Normally, the learning weight l is supplied as an input variable during each trial, but the learning weight can also be generated optionally by the CIP system manager 32 as discussed below.

Kernel imputing, memory updating and monitoring operations are based on a statistical regression framework for predicting missing features as additive functions of non-missing feature values. Within the regression framework, the weights for imputing each missing feature value from all others are well-known. Formulation for the weights used for imputing are functions of sample covariance matrix inverses. In the conventional approach to regression, the F by F covariance matrix is computed first v based on a training sample, followed by inverting the covariance matrix and then computing regression weights as functions of the inverse. The conventional approach involves storing and operating with a training set that includes all measurements received up to the current input trial. Storing all prior measurements is typical for conventional systems, because all prior measurements are needed in order to first calculate present covariances from which the inverse matrix may be obtained.

Unlike conventional statistics operations, CIP kernel 21 operation does updates the inverse of v directly, based only on: (a) the inverse of v and other parameters that have been learned up to that trial; (b) incoming feature values in m[IN]; and (c) the input learning weight l. Consequently, CIP operations can keep up with rapidly arriving information, without the need for either storing and operating with a training data set or inverting a covariance matrix.

The process of updating the inverse elements of v is the CIP counterpart to conventional learning. CIP fast updating capability from trial to trial provides a statistically sound and fast improvement to conventional learning from off-line training data. As a result, the CIP System 10 provides an enhancement over the prior art.

With continuous reference to FIG. 2, the joint access memory 23 contains the feature interconnection weights, one for each of the possible F×(F−1)/2 pairs of features. The feature connection weights correspond to the lower triangular elements of v inverse. The main diagonal elements of v inverse are also used during kernel imputing and feature function monitoring, and are modified during concurrent learning. Individual elements of the v inverse main diagonal reside in their corresponding kernel processor.

Once the kernel 21 has imputed feature values in m[OUT], the kernel sends the imputed feature vector in[OUT] back to the transducer output processor 24 via line 33, where the imputed feature values in m[OUT] are converted to imputed measurement values in j[OUT] for system output by the transducer output processor 26. In some modeling situations, only simple output conversions are needed. For example, if the CIP system features alternatively include the original measurements along with product functions of the original measurements, the output processor 26 converts imputed features to imputed measurements by excluding all but the imputed measurement set from the imputed feature set. In other modeling situations, more elaborate conversion may be utilized. For example, one CIP system feature alternative may convert a set of measurements to the average of the set of measurements during transducer input processing, in which case the transducer output processor 26 sets all imputed output measurement values to their common imputed average value.

Once imputed measurement values j[OUT] have been produced as outputs, the outputs, can be useful in several ways, including: (a) replacing direct measurement values, such as during periods when instruments break down; (b) predicting measurement values before the measurements occur, such as during econometric forecasting operations; and (c) predicting measurement values that may never occur, such as during potentially faulty product classification operations.

The manager 22 monitors and controls CIP system operation. The subsystems of the manager 22 include: the coordinator 38, which provides the CIP system-user interface; the executive 39, which dictates overall system control; the learning weight controller 40, which provides l to the kernel 21 in place of externally supplied l values from the data acquisition device 15 (FIG. 1); and the feature function controller 41, which establishes and modifies measurement-feature function structure. In CIP system concurrent operation, the kernel and transducer 20 modules are active in a concurrent mode. When the system is operating in the concurrent mode, the kernel 21 and transducer 20 operate continuously based on input measurement values, plausibility values and learning weights, according to system control parameters that are set by the executive 48. These parameters include input measurements specification, feature computing specifications, inter-module buffering specifications and output measurement specifications. During concurrent operation, the CIP system produces imputed feature values, feature value monitoring statistics, updated learned kernel parameter values and imputed output measurement values.

The CIP system may also perform feature value monitoring operations, which are performed by the kernel 21, the learning weight controller 40 and the coordinator 49. During feature value monitoring operations, each kernel processor 31$_1$ through 31$_F$ sends monitoring statistics via connections 40$_1$ through 40$_F$ to the manager 22. Deviance monitoring statistics are used during each trial by the learning weight controller 40 within the manager 22 to assess the extent that each feature is unexpected, relative to: (a) the mean value that has been computed from prior learning for that feature, and (b) the value of that feature that would be imputed if the feature was missing. Feature value statistics that are sent from each kernel processor include the observed value, a learned mean, a regressed value and a learned variance value for the feature of the processor. The learning weight controller 40 uses the feature value monitoring, statistics to compute concurrent feature deviance measures. These deviance measures are then sent from the learning weight controller 40 to the coordinator 38 to produce monitoring graphics, which are then sent through the system bus 19 to the monitor 14.

In addition to specifying feature imputing, feature value monitoring and learned parameter updating operations concurrently, the CIP manager 22 specifies feature function assessment and assignment occasionally, and the CIP manager 22 controls learning weight assignment alternatively. Feature function assessment and assignment are performed by the feature function controller 41 within the manager 22, by simultaneously accessing the interconnection weights in the joint access memory 23 through a parallel port $41_{JAM}$, along with other weights in processor 1 to processor F through connections $41_1$ to $41_F$. The feature function controller 41 first examines the interconnection weights to identify features that are either redundant or unnecessary, that is, features that do not provide information useful for learning and imputing. Feature function controller 41 then commands the transducer input processor 24 to combine redundant features, remove unnecessary features or add new features accordingly, through control lines 43.

As with CIP imputing and learned parameter updating operations, CIP feature function monitoring and control operations are based on a statistical regression framework. For example, all of the necessary partial correlation coefficients and multiple correlation coefficients for identifying redundant or unnecessary features can be computed from the elements of v inverse that reside in the joint access memory 23, and architectures closely resembling the kernel 21 architecture can be used to perform such refinement operations. Although the refining operations are not performed as fast as concurrent kernel 21 operations, the refining operations can be performed almost as quickly and in concert with ongoing kernel 21 operations by using parallel refinement processors as discussed below.

The probability/quantum basis for learning weight interpretation allows learning weight schedules to be computed that will produce: (a) equal impact learning, through which each input feature vector will have the same overall impact on parameter learning; (b) conservative learning, through which less recent input feature vectors will have higher overall impact on parameter learning than more recent input feature vectors; and (c) liberal learning, through which more recent input feature vectors will have lower overall impact. When the learning weight controller 40 is used to supply learning weights to the CIP system in a basic form, the system is programmed to only supply equal impact learning weights. In another form, the learning weight controller 40 may use the CIP system monitoring statistics to identify unusual trends in imputing accuracy. If imputing accuracy drops sharply, the learning weight controller 40 changes the learning weight computing schedule to produce more liberal learning, based on the assumption that imputing accuracy degradation is caused by a new set of circumstances that require previously learned parameters to be given less impact. The learning weight may also modify elements of the plausibility vector p if feature value monitoring indicates erratic measurement behavior.

CONVENTIONAL SEQUENTIAL COMPUTER SYSTEM OVERVIEW

Figure 3:
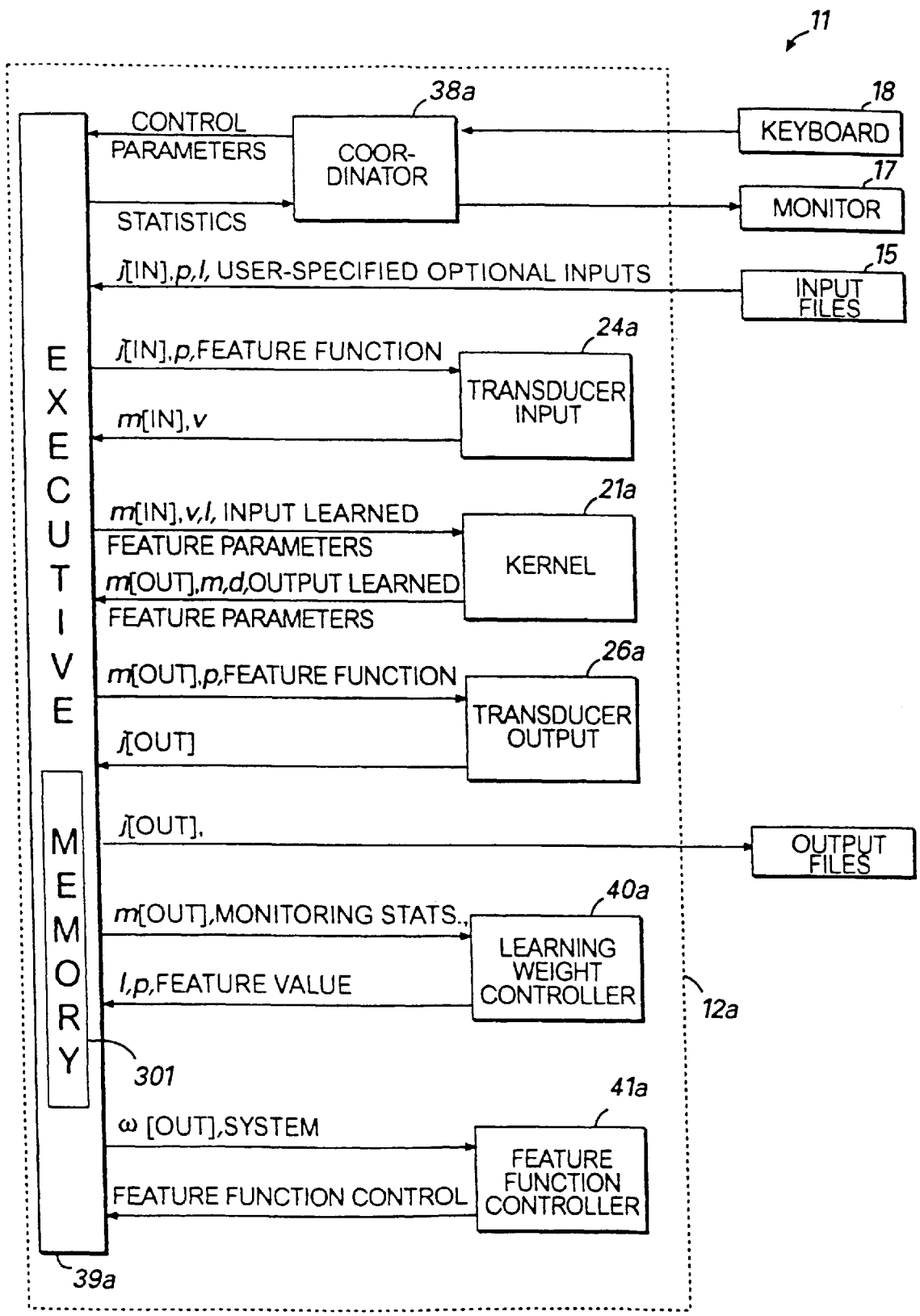
FIG. 3 is a block diagram that illustrates a sequential computer embodiment of the preferred embodiment of the present invention.

Referring to FIG. 3, a block diagram illustrating the CIP system 10 embodiment on a conventional computer with one central processing unit is shown. The basic components of the conventional sequential computer embodiment 12a of the sequential CIP system 11 include: a transducer input 24a process; a kernel process 21a; a transducer output process 26a; a coordinator 49a; an executive 39a; a learning weight controller 40a; and a feature function controller 41a. Each of the components of the sequential CIP system 11 perform the same basic functions as the parallel CIP system 10. However, in a conventional computer system, only one central processor is utilized. Thus, in utilizing only one processor for kernel 31a operation, the time for processing input data takes more time to implement than in the parallel CIP computing system 12.

Just as in the parallel system embodiment, the sequential system receives an input vector j[IN] and a plausibility value p. As in the parallel system, the input vectors j[IN] are also converted to input feature values m[IN]. Plausibility values p are converted to viability values v as discussed above. The kernel process 31a receives the feature input value m[IN], the viability value, and a learning weight l from the system. The kernel 21a process produces an output feature vector m[OUT] based upon connection weights stored in conventional memory 301 that is allocated by the executive 39a. The output feature vector m[OUT] is transferred to the output transducer 26a for conversion to an output measurement value j[OUT] for external use, as discussed above in connection with the CIP system 10.

The executive block 39a represents the sequential computer main function and other blocks represent CIP subroutines. Memory 301 for the kernel subroutine embodiment has conventional data array form as known to those skilled in the art, and all shared memory storage is allocated and maintained by the main executive function. The executive 39a first initializes the CIP system by calling the coordinator 39a subroutine, which in turn obtains user-supplied system specifications, such as the length of the measurement vector j [IN] and the number of feature functions, through the keyboard 18. The executive 39a then allocates learned parameter memory and other storage accordingly.

During each concurrent trial, the executive 39a program calls the transducer input processor 24a subroutine, followed by the kernel 21a subroutine, which is followed by calling the transducer output 26a subroutine. If the executive program 39a has been initially set to do so, the executive 39a may also call the learning weight controller 40a subroutine at the beginning of each trial to receive an input learning weight l, and the executive may provide feature monitoring statistics at the end of each trial to the coordinator 38a for graphical display on the monitor 17. As in the parallel embodiment, each trial for the sequential embodiment includes reading an input measurement vector j[IN] and a plausibility vector p, followed by writing an imputed measurement vector j[OUT]. In conventional computing, however, input-output operations utilize input files 15 and output files 17. The input files are data files read from a storage medium that receives input values from the DAD 15. The output files may be utilized outside the CIP system in any manner the user chooses.

In addition to concurrent operations, the sequential embodiment may utilize occasional refinement operations, as discussed above in connection with the parallel system. In the sequential version the executive 38a will interrupt concurrent operation occasionally, as specified by the user during initialization. During each such interrupt, the executive 39a will call the feature function controller 41a, which will receive the connection weight matrix as one of its inputs. The feature function controller 41a will then use the connection weight matrix to identify redundant and unnecessary features, after which it will return new feature specifications to the executive 38a accordingly. The executive 38a will then convey the new specifications to the transducer input subroutine 24a and the transducer output subroutine 26a, during future concurrent operations that follow.

OPERATION AND IMPLEMENTATION IN MORE DETAIL

An Example of CIP Imputing

Figure 4:
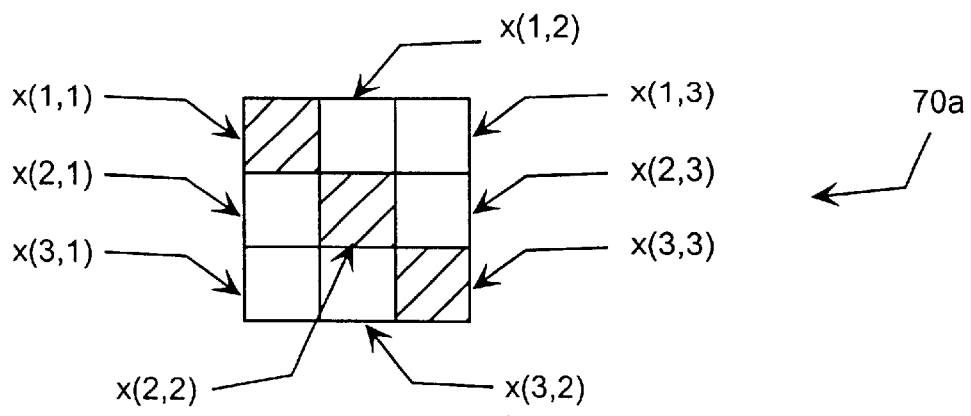
FIG. 4 shows an array of pixel values that may be operated on by the preferred embodiment of the present invention.
Figure 4:
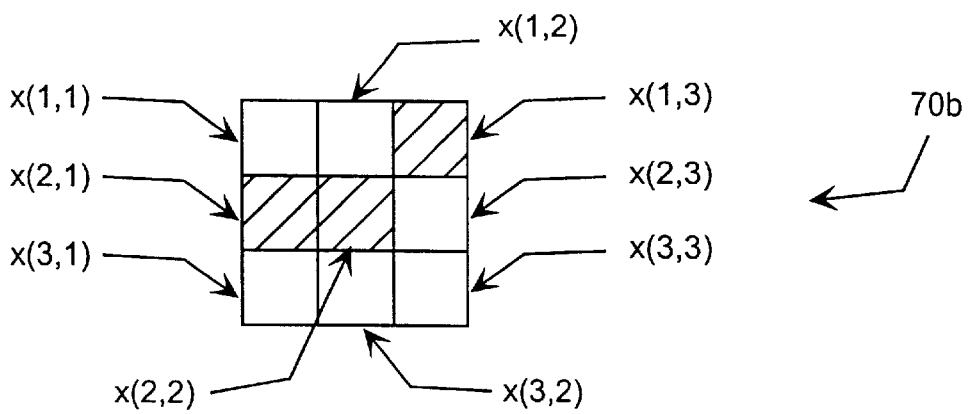
Figure 4:
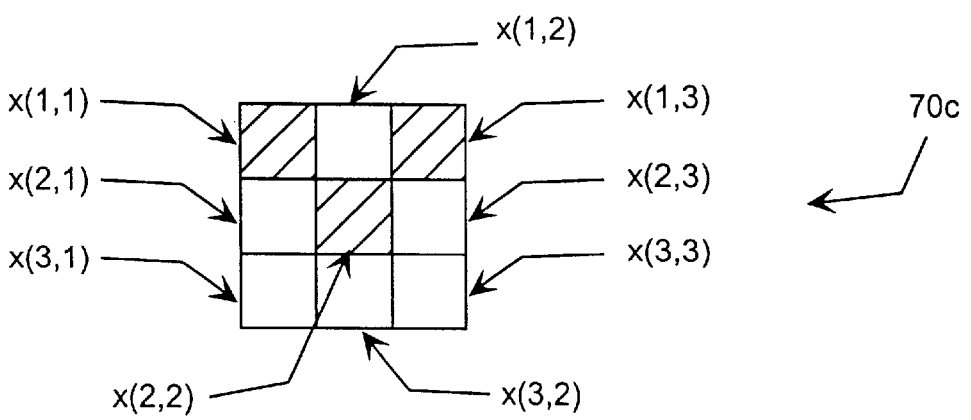

The following example illustrates some CIP operations. Referring to FIG. 4, three binary pixel arrays that could represent three distinct CIP input measurement vectors are shown. Each array has nine measurement variables, labeled as x(1,1) through x(3,3). The black squares may be represented by input binary values of 1, while the white squares may be represented by binary input values of 0. The three arrays can thus be represented as CIP binary measurement vectorsj[B] having values of (1, 0, 0, 0, 1, 0, 0, 0, 1,),(0, 0, 1, 1, 1, 0, 0, 0, 0) and (1, 0, 1, 0, 1, 0, 0, 0, 0).

As noted above, the CIP system uses each plausibility value in p to establish missing or non-missing roles of its corresponding measurement value inj[N]. Thus, if all nine p values corresponding to the FIG. 4 measurements are 1 then all nine j[IN] values will be used for learning. However, if two p elements are 0, indicating that the two corresponding j[IN] values are missing, the two corresponding J[OUT] values will be imputed from the other seven j[IN] values that have corresponding values of 1.

With continuing reference to FIG. 4, assume that at trial number 101 p=(1, 1, 0, 1, 1, 1, 1, 1, 0) and j[IN]=(1, 0, ?, 0, 1, 0, 0, 0, ?), where the two "?" symbols represent unknown values. In this example, only the top left and middle two pixels arc black, the top right and lower right pixels are missing and the other 5 pixels are white. The seven non-missing values inj[iN] will thus be used to update learning; the resulting output will be j[OUT]=(1, 0, j[OUT](3), 0, 1, 0, 0, 0, j[OUT](9)); and j[OUT](3) as well as j[OUT](9) will be imputed from the seven other known values, using regression analysis based on previously learned parameter values. Therefore, the output pattern will be either 70a or 70c, depending on previously learned parameter values.

If the CIP system has been set up for equal impact learning operation, the pattern that occurred most between the possible 70a and 70c patterns in previous trials number 1 through 100 would be imputed. Suppose, for example, that in previous trials 1 through 100 all nine values of p were 1 for each such trial, and j[IN] values corresponded to types 70a, 70b and 70c for 40, 19 and 41 such trials, respectively. In this example, the unknown upper right and lower right pixels during trial 101 will be imputed as white and black, respectively in keeping with 70c, because the CIP system will have been taught to expect 70c slightly more often than the only other possibility 70a.

Transducer Input Operation

Input measurements can be termed arithmetic, binary and categorical. Arithmetic measurements such as altitude, temperature and time of day have assigned values that can be used in an ordered way, through the arithmetic operations of addition, subtraction, multiplication and division. When a measurement has only two possible states, the measurement may be termed binary and may be generally represented by a value of either 1 or 0. Non-arithmetic measurements having more than two possible states may be termed categorical. CIP measurement vectorsj may thus be grouped into arithmetic, binary and categorical sub-vectors (j[A], j[B],j[C]), where each sub-vector can be of any length.

Depending on how options are specified, the CIP system either (a) converts arithmetic and binary measurement values to feature values in the transducer input processor 24, or (b) sends the arithmetic or binary measurement values directly to the CIP kernel without transforming the measurement values. By contrast, the CIP system converts categorical measurement values to equivalent binary feature values. In order to represent all possible contingencies among categorical variables, the CIP system converts each categorical measurement value j[C] having one of C possible values to a binary feature vector m[C] having C−1 elements, which also have C possible values. For example, if a categorical variable has possible values 1, 2, 3 and 4, the resulting categorical feature vector has corresponding values (1, 0, 0), (0, 1, 0), (0, 0, 1) and (0, 0, 0).

After the input processor 24 has converted categorical measurements to binary features, the transducer contains only features that are either arithmetic measurements in their original input form, binary measurements in their original input form or binary equivalents to categorical measurements. All of these can be treated as arithmetic features and sent to the kernel directly, or they can be optionally converted to other arithmetic features by the input processor 24. Such optional features include, but are not limited to: arithmetic measurements raised to powers; second-order and higher-order cross-products among arithmetic measurements, binary measurements or arithmetic and binary measurements; averages among such features; principal component features; orthogonal polynomial features; and composites made up of any such features, combined with other such features in the RFM 25 that have been computed from recent measurements.

Recent features can be used to both monitor and impute (or forecast) concurrent feature values as a function of previously observed feature values stored in the recent feature memory 25. For example, suppose that measurements from a chemical process are monitored for unusual values to identify sudden measurement changes that may indicate a system failure. The CIP system identifies sudden changes by creating CIP first-order difference features, each being the difference between a measurement for the concurrent trial and the same measurement for the immediately preceding trial that has been stored in the recent feature memory 25. By creating first order difference features, the CIP system can quickly learn means and variances for such features, which in turn enables the CIP system to identify unusual values of the first-order difference features as indications of sudden change. As a second example of the use of recent feature memory, forecasts for concurrent values of a continuous process can be utilized to predict expected concurrent values before the values are actually observed. The CIP system may use the recent feature memory 25 to create each concurrent feature as the concurrent measurement values as well as the last 5 measurement values. The CIP system may then use the first 6 observed values to learn how to impute the sixth value from the last 5 during trial 6; the CIP system may then impute the seventh value from the second value through the sixth value at the beginning of trial 7 while the seventh value is missing; may then update its learned parameters at the end of trial 7 after the non-missing seventh value has been received; the CIP system may then impute the eighth value from the third value through the seventh value at the beginning of trial 8 while the eighth value is missing; and so on.

Plausibility and Viability Details.

In addition to operating with binary plausibility values as discussed in connection with FIG. 4, the CIP system can be implemented to operate with plausibility and viability values between 0 and 1. Values between 0 and 1 can occur naturally in several settings, such as preprocessing operations outside the CIP system. Suppose, for example that instead of 9 measurements only 3 measurements corresponding to average values for array rows 1 through 3 are supplied to the CIP system based on FIG. 4 data. In this example, the CIP system will operate to: (a) set a plausibility value to 1 for the average if all 3 of its component pixels are non-missing, (b) set the plausibility value to 0 if all 3 of the pixels are missing; and (c) set the plausibility to some intermediate value it 1 or 2 of the 3 are missing. If one of the values is missing, the appropriate input measurement value is the average among non-missing pixel values and the appropriate plausibility value is the proportion of pixel values that are non-missing among the total number of possible pixel values.

Plausibility values between 0 and 1 also may be used in settings where CIP system users wish to make subjective ratings of measurement reliability instead of calculating plausibility values objectively. The CIP system treats a plausibility value between 0 and 1 as a weight for measurement learning, relative to previous values of that measurement as well as concurrent values of other measurements. The processes and formulations for plausibility based weighting schemes are discussed below.

Kernel Learning Operation

As noted above, in order for the CIP system to provide useful data based on a set of measurements, the CIP system identifies relevant parameters and implements an accurate process for learning the relationships among the multiple input measurements. The CIP kernel learns during each trial by updating learned parameter estimates, which include: a vector $\mu$ of feature means, a matrix $\omega$ of connection weights, a vector $v[D]$ of variance estimates (diagonal elements of the previously described variance-covariance matrix $v$) and a vector $\lambda$ of learning history parameters. Updating formulas for the learned parameters are discussed below, but simplified versions will be discussed first for some parameters to illustrate basic properties.

The mean updating formula takes on the following simplified form if all prior and concurrent viability values are 1:

$$\mu[OUT]=(lm[IN]+\mu[IN])/(1+l). \quad (1)$$

The term $\mu[OUT]$ represents the mean of all prior measurements up to and including the current measurement value.

Equation (1) changes $\mu$ values toward m[IN] values more for higher values of l than for lower values of l, in accordance with the above learning weight discussion. Equation (1) is preferably modified, however, because Equation (1) may not accurately reflect different plausibility histories for different elements of $\mu[IN]$. Instead, Equation (1) is modified to combine $\mu[IN]$ with m[IN] according to elements of a learning history parameter $\lambda$, which keeps track of previous learning history at the feature element level.

Equation (1) can be justified and derived within the quantum conceptual framework for the CIP system, as follows: suppose that the learning weight l is the ratio of concurrent quantum counts for m[IN] to the concurrent quantum counts q[PRIOR] associated with $\mu[IN]$, as the CIP system does; suppose further that $\mu[IN]$ is the mean of q[IN] prior quantum counts and that m[IN] is the mean of q[PRIOR] concurrent quantum counts; algebra can show that Equation (1) will be the overall mean that is based on all q[IN] prior counts along with all q[PRIOR] concurrent counts.

Equation (1) only applies when all viability values are 1. The CIP system preferably uses a more precise function than Equation (1), in order to properly weight individual elements of $\mu[OUT]$ differentially, according to the different viability histories of $\mu[OUT]$ elements. The mean updating formula is, for any element $\mu(f)$ of $\mu$, $$\mu[OUT](f)=(l[C](f)m[IN](f)+\mu[IN](f))/(1=l[C](f)) \quad (2)$$

($f=1, \ldots , F$—such "$f$" labeling is used to denote array elements in the remainder of this document). Equation (2) resembles Equation (1), except a single learning weight l as in Equation (1), which would be used for all feature vectors elements during a trial, is replaced by a distinct learning weight $l[C](f)$ for each component feature vector element. Thus, each feature vector element may be individually rather than each feature vector element have the same weight as in Equation (1). These component learning weights, in turn, depend on concurrent and prior learning viability values of the form.

$$l[C](f)=lv(f)\lambda(f). \quad (3)$$

The learning history parameter $\lambda$ is also updated, after being used to update feature means, to keep a running record of prior learning for each feature, as follows:

$$\lambda[OUT](f)=\lambda[IN](f)(1+l)/(1+l[C](f)). \quad (4)$$

The remaining learned parameters $v[D]$ and $\omega$ are elements of the covariance matrix $v$ and $v$ inverse respectively. Also, $v$ depends on deviations of features values from means values instead of features values alone commonly known as errors. As a result, $v[D]$ and $(\omega)$ may be updated, not as functions of features values alone, but instead as functions of error vectors having the form, $$e=m[IN]-\mu[OUT]. \quad (5)$$

An appropriate formula for updating the elements of $v$ might be, $$v[OUT]=(lm[IN]^T m[IN]+v[IN])/(1+l) \quad (6)$$

(the T superscript in Equation (6), as used herein, denotes vector transposition). Equation (6) is similar in general form to Equation (3), because Equation (3) is based on the same CIP quantum count framework. Just as Equation (3) produces an overall average $\mu[OUT]$ of assumed quantum count values, Equation (6) produces an overall average $v[OUT]$ of squared deviance and cross-product values from the mean vector $\mu[OUT]$.

An appropriate formula for updating the elements of $(\omega)$ based on Equation (6) is $$\omega[OUT]=1+l)(\omega[IN]-l(e\ \omega[IN])^T e\ \omega[IN](1+d)), \quad (7)$$

where $$d=e\omega[IN]e^T. \quad (8)$$

Equation (7) is based on a standard formula for updating the inverse of a matrix having form (6), when the inverse of the second term in (6) is known. Equation (7) is also based on the same quantum count rationale as Equations (3) and (6).

Equations (5) through (8) are only approximate versions of the preferred CIP error vector and updating formulas. However, different and preferred alternatives are used for four reasons: first, the CIP system counterpart to the error vector formula Equation (5) is based on $\mu[IN]$ instead of $\mu[OUT]$, since the CIP kernel can update learned parameters more quickly utilizing $\mu[IN]$, thus furthering fast operation. Second, the preferred CIP embodiment equation to Equation (5) reduces each element of the error vector e toward 0 if the corresponding concurrent viability $v(f)$ is less than 1. This reduction gives each element of the e vector an appropriately smaller role in updating elements of $v$ and $\omega$ if the e vector's corresponding element of m[IN] has a low viability value. Third, the CIP kernel does not require all elements of $v$ but uses the elements of v[D] instead where [D] represents diagonal elements. Finally, Equation (6) and Equation (7) are only accurate if previous $\mu$ values that have been used to compute previous $\mu$[OUT] and $\omega$[OUT] values are the same as $\mu$[OUT] for the current trial. Since all such $\mu$ values change during Equation (7) the CIP system uses an appropriate modification to Equation (7) in the preferred CIP embodiment. The preferred alternatives to Equation (5) through (8) are, $$e[IN](f)=v(f)(m[IN](f)-\mu[IN](f))/(1+l[C](f)), \quad (9)$$

$$v[D,OUT](f)=l\ e[IN](f)^2+v[D,IN](f)/(1+l) \quad (10a)$$

$$v[OUT]=l\ m[IN]^T m[IN]+v[IN]/(1+l) \quad (10b)$$

and $$\omega[OUT]=(1+l)(\omega[IN]-cx^T x), \quad (11)$$

where $$c=l(1+l)/[1+l(1+l)d], \quad (12)$$

$$x=e[IN]\omega[IN] \quad (13)$$

and $$d=e[IN]\omega[IN]e[IN]^T$$
$$=x\ e[IN]^T. \quad (14)$$

The $\omega$[IN], $\mu$[IN] and v[D,IN] values represent values that were the output values from the previous trial that were stored in the learned parameter memory.

Kernel Imputing Operations

CIP feature imputing formulas are based on linear regression theory and formulations, that fit CIP storage, speed, input-output flexibility and parallel embodiment. Efficient kernel operation is enabled because regression weights for imputing any feature from all other features can be easily computed from elements of v inverse, which are available in $\omega$.

The CIP kernel imputes each missing m[IN] element as a function of all non-missing m[IN] elements, where missing and non-missing m[IN] elements are indicated by corresponding viability v element values of 0 and 1, respectively. If a CIP application utilizes F features and the viability vector for a trial contains all 1 values except the first element, which is a 0 value, the CIP kernel imputes only the first feature value as a function of all others. The regression formula for imputing that first element is, $$m[OUT](1)=\mu(1)-\{[m[IN](2)-\mu(2)]\omega(2,1)+\ldots+[m[IN](F)-\mu(F)]\omega(F,1)\}/\omega(1,1)] \quad (15)$$

Formulas for imputing other in[IN] elements are similar to Equation (15), provided that only the m[IN] element being imputed is missing.

The CIP kernel uses improved alternatives to Equation (15), so that the CIP system can operate when any combination of m[IN] elements may be missing. When any element is missing, the kernel imputes each missing m[IN] element by using only other in[IN] elements that are non-missing. The kernel also replaces each m[OUT] element by the corresponding m[IN] element whenever m[IN] is non-missing. The regression formulas used by the CIP system are also designed for parallel as well as efficient operation that makes maximum use of other kernel computations. For example, the kernel saves time and storage by using the elements of e[IN] and x from Equation (9) and Equation (14) for imputing, because e[IN] and x are also used for learning. The kernel imputing formula is, $$m[OUT](f)=\mu[IN](f)+e[IN](f)(2-v(f))+x(f)(v(f)-1)/\omega(f,f) \quad (16)$$

Monitoring Operations

The kernel produces several statistics for feature value monitoring and graphical display. these include the learned feature mean vector $\mu$[OUT], feature variances v[D] and d from Equation (15), which is a well-known statistical monitoring measure called Mahalanobis distance. The kernel also produces another set of regressed feature values, which arc the imputed values that each feature would have if the feature was missing. These regressed values have the form, $$\hat{m}(f)=\mu[IN](f)-x(f)/\omega(f,f)+e[IN](f). \quad (17)$$

Given the above monitoring statistics from the kernel, the CIP system can use the statistics in several ways, as specified by user options. One use is to plot deviance measures as a function of trial number, including the Mahalanobis distance measure d, standardized squared deviance values from learned means, $$d[1](f)=(m[IN]-\mu[OUT](f))^2/v[D,OUT](f) \quad (18)$$

and standardized squared deviance values between regressed values, $$d[2](f)=(m[IN]-\hat{m}(f))^2/v[D,OUT](f). \quad (19)$$

The Mahalanobis distance measure d and the three deviance measures of equations (17), (18), and (19) are useful indices of unusual input behavior. The Mahalanobis distance measure d is a useful global measure for the entire feature vector, because d is an increasing function of the squared difference between each observed feature vector and the feature learned mean vector. The standardized deviance measures d[1](f) are component feature counterparts to the global measure d, which can help pinpoint unusual feature values. The standardized residual measures d[2](f) indicate how input features deviate from their regressed values, based not only oil their previously learned means but also on other non-missing concurrent feature values.

The CIP system can also use special features in conjunction with their monitoring statistics to produce useful information about unusual feature trends. For example, for any feature of interest, a new feature can be computed that is the difference between the concurrent feature value and the feature value from the immediately preceding trial. The resulting deviance measure from Equation (17) provides a useful measure of unusual feature value change. The CIP system can also use a similar approach based on second-order differences instead of first-order differences to identify unusual deviations from ordinary feature changes. The CIP system can thus provide a variety of graphical deviance plots for manual user analysis outside the CIP system.

The CIP system can also use deviance information internally to control learning weights and schedule feature modification operations. For example, the system can establish a preselected cutoff value for the global distance measure d. The system can then treat a d value exceeding the preselected cutoff value as evidence of a data input device problem, and the system can set future learning weight values to 0 accordingly until the problem is fixed. Likewise, the component deviance measures d[1](f) and d[2](f) can be used to set measurement plausibility or feature viability values to 0 after the component deviance measures have exceeded pre-specified cutoff values. Setting the learning weight to zero prevents input problems from adversely affecting the accuracy of future CIP operations. The firm statistical basis of the CIP system enables the CIP system to be useful for such decision applications, because the distance measures follow chi-square distributions in a variety of measurement settings. As a result, distance cutoff values can be deduced from known chi square cumulative probability values.

Learning Weight Control Operation

The CIP system uses the learning weight l as part of the system learning. The learning weight l is the ratio of a quantum count associated with the concurrent feature vector to the quantum count associated with prior parameter learning. From that basis, the CIP system produces equal impact learning weight sequences, that is, sequences based on an equal number of quantum counts for each trial. If a learning weight sequence is labeled by l(1), l(2) and so on, equal impact schedules have the form, $$l(1)=1/R, \quad (20)$$

$$l(2)=1/(R+1), \quad (21)$$

$$l(3)=1/(R+2) \quad (22)$$

and so on. The constant R is the ratio of the common quantum count for all such trials to an initial quantum count. The role of this ratio and the initial quantum count is discussed below.

In addition to providing equal impact learning weight sequences, CIP users or the CIP system can generate sequences that are either liberal or conservative. Liberal sequences give more impact to more recent trial feature values, while conservative sequences give more impact to less recent trial feature values. For example, a learning sequence with all learning weights set to 1 is liberal, while one that sets all but the first learning weight to 0 is conservative. Liberal sequences are appropriate when the input CIP data are being generated according to continuously changing parameter values, and conservative sequences are appropriate when more recent information is not as reliable as less recent information.

Learned Parameter Initialization

The CIP system treats initial values for learned regression parameters $\mu$, $v[D]$ and $\omega$ as if they were generated by observed feature values. During the first trial the CIP kernel combines initial values with information from the first feature vector to produce updated parameter values, according to Equations (2), (10) and (11); and during the second trial the CIP kernel combine initial values and first trial values with information from the second vector to produce new updated parameter values. This process is repeated for subsequent trials.

After any trial having a positive learning weight l, the impact of initial parameter values on overall learning will be less than the initial parameter impact before the trial. As a result, effects due to particular initial regression parameter values will be small after a small number of learning trials, unless very conservative learning weight sequences are provided to the kernel.

In some applications where accurate imputing by the CIP system may be required from the first trial on, initial values for learned regression parameters can be important. For accurate early imputing in Such applications, the CIP system may accept user-supplied initial regression parameter values from a keypad 17 as illustrated in FIG. 1.

The CIP system provides default initial values for learned regression parameters as follows: the default value for each element of the mean vector $\mu$ is 0; the default value for the connection weight matrix $\omega$ is the identity matrix; and the default value for each element of the variance vector $v[D]$ is 1. Using the identity matrix as the initial default value for $\omega$ produces initial imputed feature values that do not depend initially on other feature values. The initial identity matrix also enables the CIP system to impute feature values from the first trial onward. By contrast, conventional statistical approaches require that at least F learning trials (where F is the number of features) before any imputing can occur.

In addition to initializing learned regression parameters, the CIP system initializes elements of the learning history parameter vector $\lambda$. The learning history parameter vector dictates how much an input feature vector element will affect learning, relative to previous learning. The default initial value for each element of the learning history vector $\lambda$ is 1, which gives each input feature vector element the same impact on learning during the first learning trial.

Feature Function Monitoring Operation

The CIP system alternatively may implement three kinds of feature function monitoring statistics for graphical display: a vector of squared feature multiple correlations $\chi[M]$, a vector of tolerance band ratio values r and an array of partial correlations $\chi[P]$. Each element $\chi[M](f)$ of $\chi[M]$ is the squared multiple correlation for imputing the corresponding feature vector element $m(f)$ from the other elements in m. When optionally implemented in the CIP system, squared multiple correlations can be interpreted according to well-known statistical properties. Such statistical properties imply that each feature can be predicted by other features if the feature's squared correlation is near the maximum possible value of 1 instead of the minimum possible value of 0.

Each squared multiple correlation $\chi[M](f)$ also may be optionally used to compute and supply the corresponding tolerance band ratio element $r(f)$. Each element of r can be expressed as a ratio of two standard deviations. The numerator standard deviation is the square root of $v[D](f)$, while the denominator standard deviation is the standard deviation of $\hat{m}(f)$. Since error tolerance band widths are routinely made proportional to standard deviations, it follows that each $r(f)$ value is the tolerance band width for imputing $m(f)$ if all other $m[IN]$ elements are not missing, relative to the tolerance band width for imputing $m(f)$ if all other $m[IN]$ values are missing.

The partial correlation array $\chi[P]$ contains a partial correlation $\chi[P](f,g)$ for each possible pair of features $f$ and $g (f=1, \ldots, F-1; g=1, \ldots F)$ Each partial correlation is an index $\chi$ of how highly two features are correlated, once they have been adjusted for correlations with all other features. As a result, users can examine the partial correlations to decide if any given feature is unnecessary for imputing any other given feature. Users can also examine rows of the partial correlation matrix to identify if a pair of features can be combined to produce an average, instead of being used separately. For example, suppose that two features are needed to impute a third feature and each partial correlation for the first feature is the same as the corresponding partial correlation for the second feature. Both such feature values can then be replaced by their average value for imputing the third feature value, without loss of imputing accuracy.

An advantage provided by the CIP system is concurrent operation capability in conjunction with occasional feature function assessment by the manager 22, with provision for performing concurrent operations very quickly and performing feature function assessment operations promptly. The CIP system may use the following formula to obtain squared multiple correlation values, $$\chi[M](f)=1-\nu[D][D](f)/\omega(f,f);\qquad(23)$$

the system may use the following formula for tolerance band values, $$r(f)=(1-\chi[M](f))^{1/12};\qquad(24)$$

the system may use the following formula for partial correlation values, $$\chi[P](f,g)=-\omega(f,g)/(\omega(f,f)\omega(g,g))^{1/12}.\qquad(25)$$

In addition to supplying the above feature function assessment statistics to users, the CIP system can also supply the connection weight matrix ω to users for user modification and interpretation. For example, users can compute and assess principal component coefficients, orthogonal polynomial coefficients and the like from ω to identify essential features to fit user needs. Once a user has identified essential features, the user can either reformulate the input transducer functions or supply features outside the CIP system, accordingly.

Feature Function Control Operation

In addition to supplying feature assessment statistics and ω elements for manual external use, the CIP system can use the statistics internally and automatically, through its feature function controller (FIGS. 2 and 3). For example, the feature function controller can identify unnecessary features for removal by checking partial correlation and squared multiple correlation values against predetermined cutoff values. Similarly, the feature function controller can identify redundant feature pairs by checking squared differences among their partial correlation values against predetermined cutoff values. Once such unnecessary or redundant features have been identified, the feature function controller can send feature function modification commands to the transducer input processor and transducer output processor accordingly.

In addition to modifying transducer operations during changes in feature function specification, the CIP system can also modify elements of the connection weight matrix ω. The elements of ω can be adjusted for the removal of an unnecessary feature, for example, feature $f$, to produce a new, adjusted connection weight matrix with one less row and one less column, say $\omega\{f,f\}$, as follows. If the submatrix of ω excluding row $f$ and column $f$ is labeled by $\omega<f,f>$ and the deleted row $f$ is labeled by $\omega<f>$, then an appropriate adjustment formula based on a standard matrix algebra function is, $$\omega\{f,f\}=\omega<f,f>-\omega<f>^T\omega<f>/\omega(f,f).\qquad(26)$$

Parallel Kernel Operation

As noted above regarding the CIP System discussed in connection with FIG. 2, the parallel CIP kernel 21 utilizes connection weights between features processors during concurrent imputing, monitoring and learned parameter memory updating operations. As also noted above, the parallel CIP kernel 21 processes F features per trial and uses F parallel feature processors $31_1$ through $31_F$, along with a Mahalanobis distance processor 34.

Because processors have a limited number of outputs that may be driven and a processor is utilized to process feature values, implementing a larger number of features could readily exceed the number of outputs that a processor can drive. The parallel CIP system solves the output problem by providing a joint access memory 23 that has a switching junction for connecting pairs of feature processors that are accessed according to a coordinated timing scheme. The switching junctions serve to enable each processor to exchange pertinent information so that a large number of processors may operate in parallel. In the CIP parallel kernel 21 system, a processor output only drives one input at any given coordination time interval, as explained below.

Figure 5:
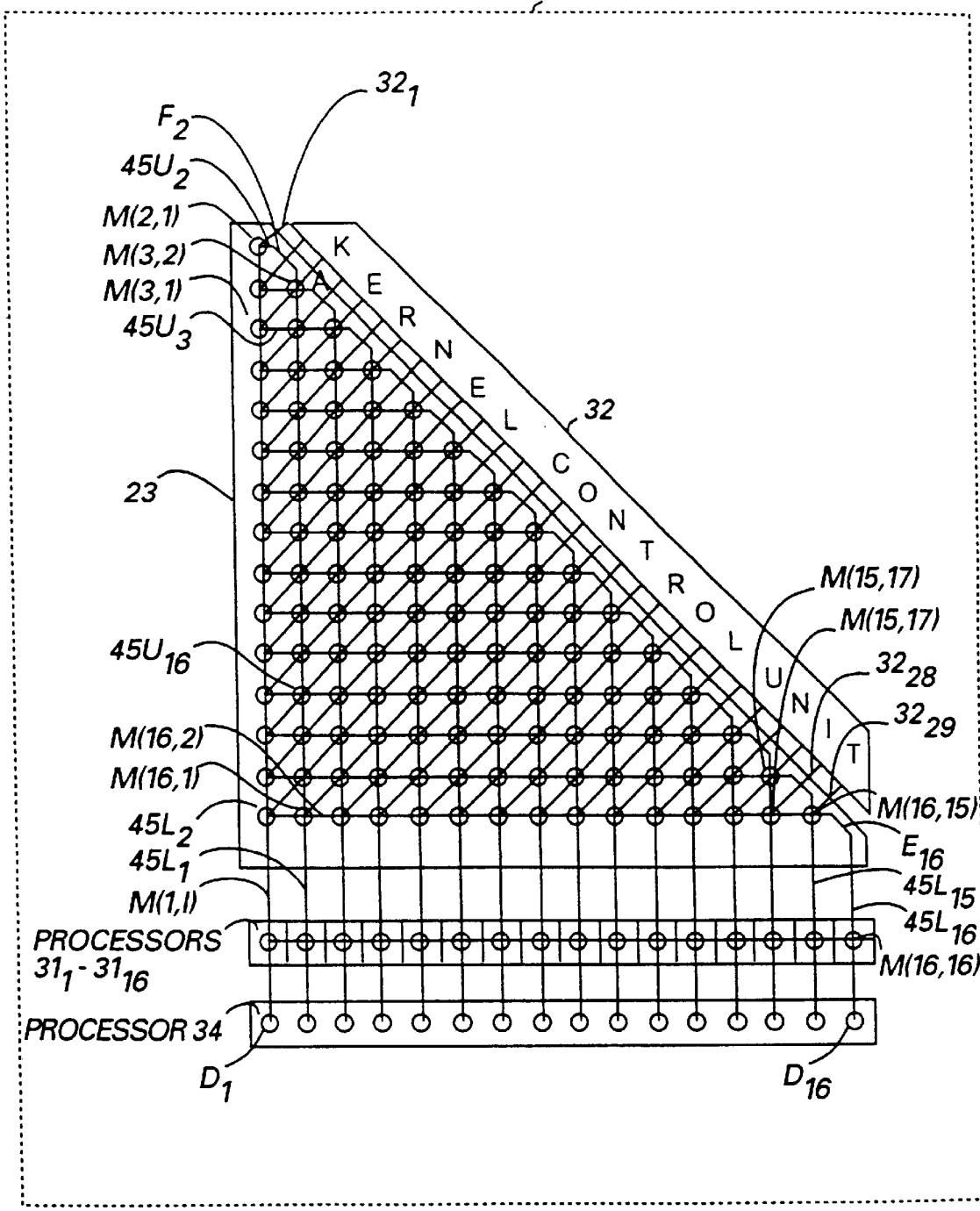
FIG. 5 shows a circuit layout for the joint access memory and processors used in the parallel embodiment of the present invention.

Referring to FIG. 5, a circuit layout of the conductors and interconnections among parallel kernel processors is shown, for F=16. The illustrated circuitry enables each feature processor to be connected to elements of the joint access memory 23, identified by circles and labeled M, and the circuitry enables every processor to be paired with every other through an organized scheme that is described below. Each processor $31_1$ through $31_{16}$ is also connected to a register $D_1$ through $D_{16}$ in the distance processor 34.

In addition to the sixteen feature processors $31_1$ through $31_{16}$ and a distance processor 34, FIG. 5 shows the layout of the conductor buses between the processors $31_1$ through $31_{16}$ and the distance processor 34. FIG. 5 also illustrates the interconnections of the processors $31_1$ through $31_{16}$ with the joint access memory 23 and the kernel control unit 32.

The circuitry illustrated in FIG. 5 may be implemented in a silicon chip layout, containing a lower bus layer, an upper bus layer, a set of semiconductor layers between and connecting the lower and upper bus layers and a control bus layer above all of the other layers. Lines $45L_1$ through $45L_{16}$ in FIG. 5 represent buses in the lower bus layer; lines $45U_2$ through $45U_{15}$ represent buses in the upper bus layer; lines $E_1$ through $E_{16}$ represent connection extensions between the lower layer buses and upper layer buses along the diagonal edge formed by the joint access memory elements; and transverse lines $32_1$ through $32_{29}$ represent joint access memory 23 control buses that are operated by the kernel control unit 32 to control joint access memory 23 switching.

With continuing reference to FIG. 5, each of the circles M(2,1), M(3,1) and M(3,2) through M(16,15) represents a JAM memory and switching node containing a switching junction, switching logic and a memory register, all of which may lie within semiconductor layers between the lower bus layer and the upper bus layer. The circles, M(16, 1) through M(16,15) within the feature processors $31_1$ through $31_{16}$, represent connection weight registers within the processors that contain the main diagonal of the connection weight matrix; and the circles $D_1$ through $D_{16}$ within the distance processor 34 represent registers for communicating between the distance processor 34 and the corresponding feature processors $31_1$ through $31_{16}$.

Each of the sixteen lower buses $45L_1$ through $45L_{16}$ connects the corresponding feature processor $31_1$ through $31_{16}$ to the corresponding register $D_1$ through $D_{16}$ in the distance processor 34. The connection extensions $E_1$ through $E_{16}$ connect each lower bus $45L_1$ through $45L_{16}$ to its corresponding upper bus $45U_1$ through $45U_{16}$.

Each of the lower buses $45L_1$ through $45L_{16}$ also connects the corresponding feature processor $31_1$ through $31_{16}$ to the dedicated joint access memory nodes M(2,1), M(3,1) and M(3,2) through M(16,16), as follows: lower bus $45L_1$ is connected at the bottom of JAM nodes M(2,1) and M(3,1) through the bottom of M(16,1); lower bus $45L_2$ is connected at the bottom of nodes M(3,2) through M(16,2) and at the top of node M(2,1) through the connection extension $E_2$ to the upper bus 45U. Similarly, lower buses $45L_3$ through $45L_{15}$ are connected to the bottom of corresponding joint access memory 23 nodes along each respective lower bus, and to corresponding upper buses $45U_3$ through $45U_{15}$ via their corresponding connection extensions $E_3$ through $E_{15}$, as discussed in connection with lower buses $45L_1$ and $45L_2$ and upper buses $45U_2$ and $E_2$. The upper bus $45U_3$ connects at the top of nodes M(3,2) and M(3,1).

Each of the upper buses $45U_2$ through $45U_{16}$ connect at the top of each node along the respective upper bus in the same manner as upper bus $45U_3$. (Because many connection extensions and nodes are illustrated, reference labels to all extensions $E_3$ through $E_{15}$ are not included in the figure in order to provide a more readable figure. It should be appreciated by one skilled in the art that the connection extensions and nodes may be identified using the convention utilized above.) Lower bus $45_{16}$ is connected at the top of all of the corresponding nodes M(16,1) through M(16,15) and to the corresponding upper bus $45U_{16}$ via its corresponding connection extension $E_{16}$.

Figure 7:
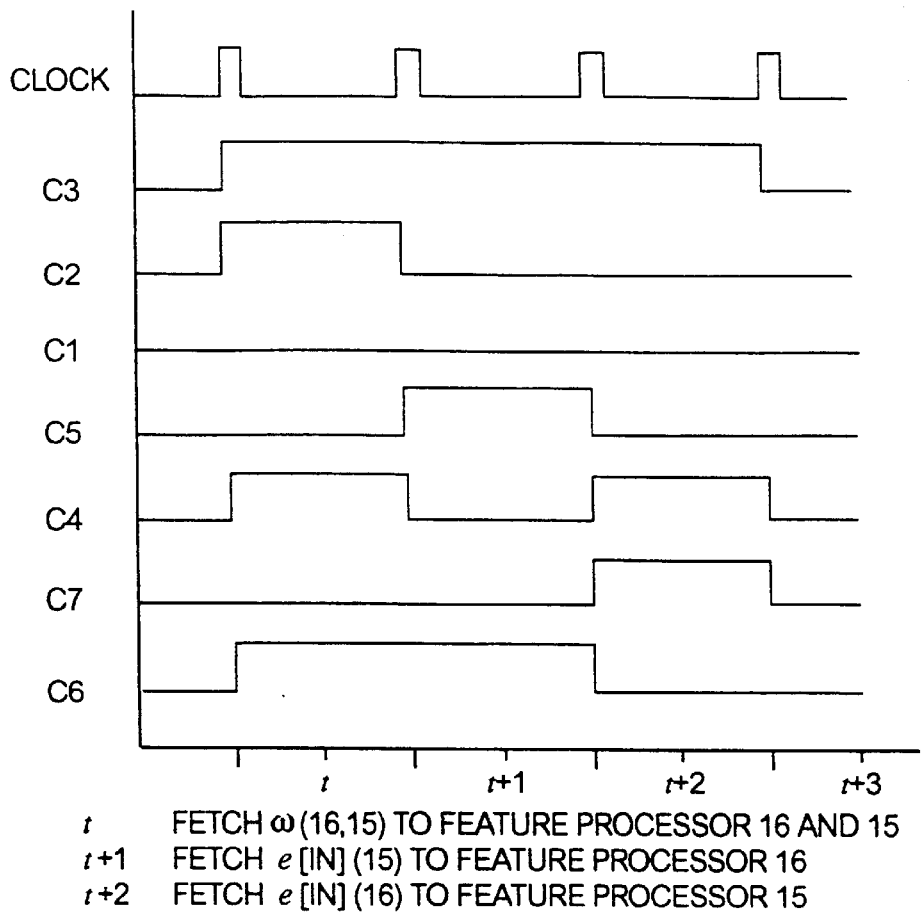
FIG. 7 shows timing diagrams for joint access memory control during intermediate matrix/vector operations of the parallel embodiment.

The lower and upper buses and the interconnections include one line of conductor for each storage bit that is implemented by the CIP kernel 21. For example, if a kernel uses 32-bit precision for storing elements of x, ω and other variables, then each of the bus lines represent 32 conductors, one for each bit of precision. Thus, the parallel kernel 21 can communicate between feature processors and access JAM elements in parallel and quickly. By contrast, each of the control buses $32_1$ through $32_{30}$ in FIG. 7 represents three conductors, the uses of which are described below.

Figure 6A:
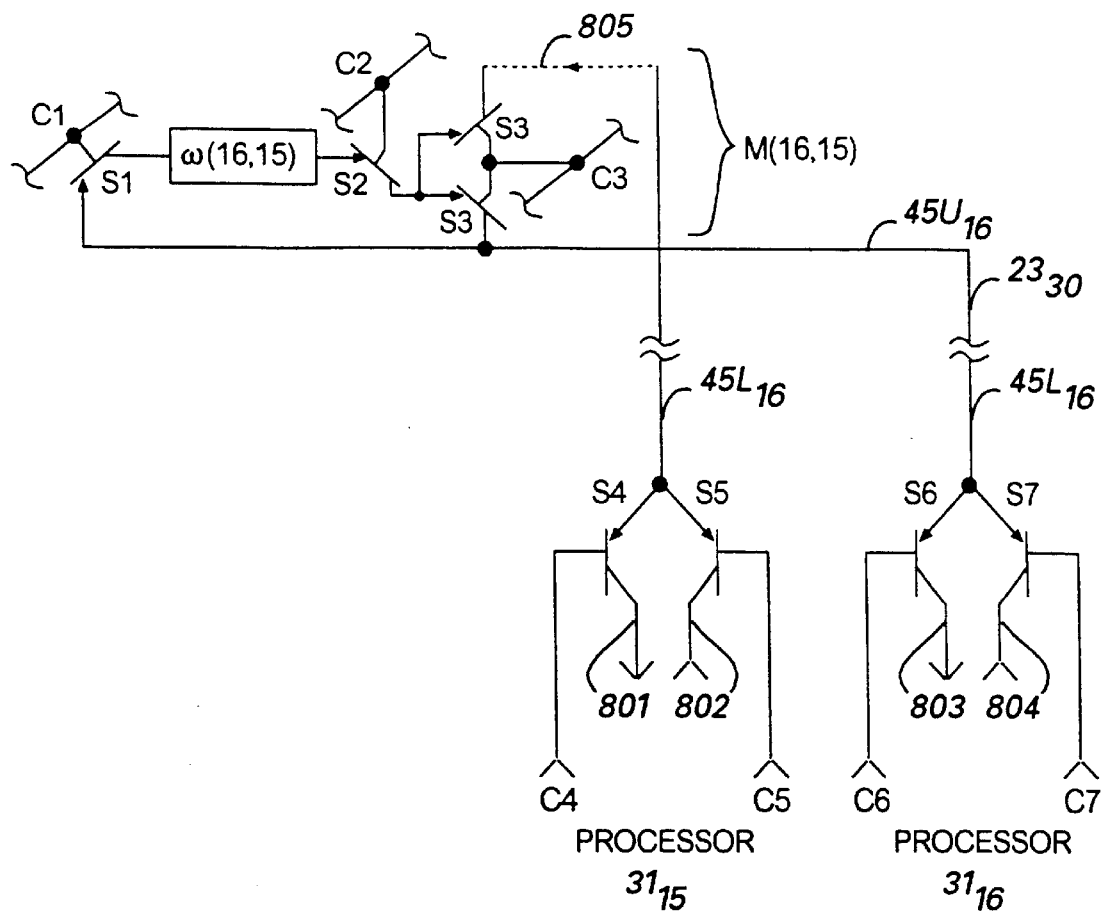
FIG. 6a shows switching detail for a node in the joint access memory of the preferred embodiment of the present invention.
Figure 6B:
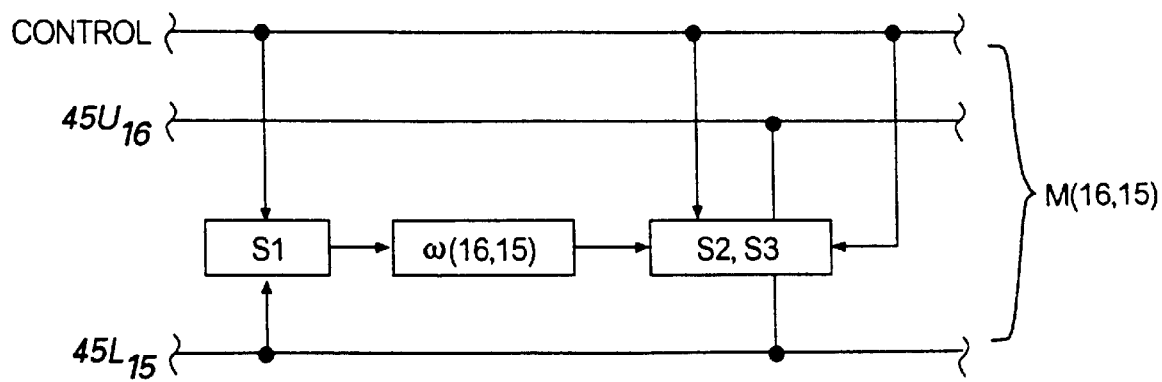
FIG. 6b shows a side view of switching detail for a node in the joint access memory of the preferred embodiment of the present invention.

Referring additionally to FIGS. 6a and 6b, switching junction detail is shown to further describe buses and joint access memory nodes within the kernel 21, components of joint access memory node M(16,15) and M(16,15) bus connections. The components and connections discussed herein apply to the connections of the other nodes and buses of the system in a corresponding manner. FIG. 6a is a top detail view of the node M(16,15) along with the node's related switches and buses, and FIG. 6b is a side view of M(16,15) along with the node's related switches and buses. FIG. 6a shows the lower bus $45L_{15}$ and processor 15 offset a small amount to the right for clarity of presentation, as indicated by the dashed off-set line 805. No such offset is illustrated in FIG. 5, which shows the lower bus $45L_{15}$ passing directly below the center of node M(16,15). As discussed in connection with FIG. 5, the upper and lower buses $45U_{16}$ and $45L_{15}$ include one conductor for each bit of storage precision. Likewise, the interconnections and switches described below contain the same number of conductors and switch contacts, respectively.

FIG. 6a shows joint access memory node M(16,15) details, including the following: a memory cell containing ω(16,15); a memory input switch S1 for updating ω(16,15); a memory output switch S2 for accessing ω(16,15); and a dual switch S3 for joining the processor $31_{16}$ upper bus $45U_{16}$ and the processor $31_{15}$ lower bus $45L_{15}$ at the output of S2. FIG. 8b shows a side view of the memory cell and same three switches illustrated in FIG. 8a.

FIG. 6a shows the processor $31_{16}$ upper bus $45U_{16}$ connected to the input for the memory cell containing ω(16,15) through S1. Thus, when S2 is closed the memory cell containing ω(16,15) is updated to contain the contents of the processor $31_{16}$ upper bus $45U_{16}$. The processor $31_{16}$ upper bus $45U_{16}$ and the processor $31_{15}$ lower bus $45L_{15}$ are interconnected when S3 is closed and S2 is opened. In addition both the processor $31_{16}$ upper bus $45U_{16}$ and the processor $31_{15}$ lower bus $45L_{15}$ are connected to the output of the memory cell containing ω(16,15) when both S2 and S3 are closed. When both S2 and S3 are closed, the contents of the memory cell containing ω(16,15) reside on both buses.

Switches S1, S2, and S3 in FIG. 6a are controlled by signals on control lines C1, C2, and C3, respectively. These three control lines comprise the control bus lines $32_{29}$ in FIG. 5. When a signal is positive on any of these control lines, the corresponding switch will be closed. Switches S4 through S7 in FIG. 6a are similarly controlled by signals on the corresponding control lines C4 through C7. Switches S4 and S5 are connected to an input bus 801 and an output bus 802 for processor $31_{15}$, respectively, while switches S6 and S7 are connected to an input bus 803 and an output bus 804 for processor 16, respectively.

Five basic switching operations ((a)–(e)) are performed that implement the circuitry illustrated in the joint access memory 23 as follows: (a) jointly accessing the ω(16,15) value by processor $31_{15}$ and processor $31_{16}$, in which case S1 through S7 are open, closed, closed, closed, open, closed and open, respectively; (b) sending a variable value from processor 16 to processor 15, in which case S1 through S7 are open, open, closed, closed, open, open and closed, respectively; (c) sending a variable value from processor $31_{15}$ to processor $31_{16}$, in which case S1 through S7 are open, open, closed, open, closed, closed and open, respectively; (d) sending the ω(16,15) value to processor $31_{16}$, in which case, S1 through S7 are open, closed, closed, open, open, closed and open, respectively; and (e) updating the memory cell containing the ω(16,15) value in which case S1 through S7 are closed, open, open, open, open, open and closed, respectively. The timing for joint access memory switching is discussed below.

Parallel kernel 21 operation is coordinated by the control unit 32 so that (a) each of the feature processors $31_1$ through $31_{16}$ is continuously busy during a trial; (b) each joint access memory bus contains no more than one variable value at any given time; (c) each memory cell sends an output value to no more than two buses at any given time; (d) and each feature processor sends the output value of the processor to no more than one input at any given time. The coordination steps are controlled by control buses $32_1$ through $32_{29}$, along with other control signals that are sent to individual feature processors.

With continuing reference to FIG. 5, in computing χ when F=16, x(1) through x(16) are computed by feature processors $31_1$ through $31_{16}$, respectively. When computing each x(1) through x(16) sums are computed among product terms, element along one row of ω multiplied by corresponding an element of e[IN], keeping with Equation (13). At the time that x is computed, the elements of e[IN] will have already been computed (as will be described below), and the elements of e[IN] will be residing in feature processors 1 through 16, respectively.

Each feature processor F computes its feature processor x(F) value by first initializing the x value at 0 and then accessing joint access memory nodes along the feature processor's lower and upper bus, one at a time. During each access, each feature processor F performs the following sequence of operations: first, fetching the stored ω element along that node; second, fetching the e[IN] element that is available at that node; third, multiplying the two elements together to obtain a cross-product; and fourth, adding the cross-product for the processor to the running sum for x(F) implemented in the processor. For example, the feature processor of focus may be processor $31_{16}$, and the processor $31_{16}$ may access M(16,15) as discussed with reference to FIG. 5. At that time, processor $31_{16}$ would thus update the x(16) value that processor $31_{16}$ is computing, by multiplying ω(16,15) with e[IN](15) and adding the product to the running x(16) value. Meanwhile, processor $31_{15}$ is updating the computation of x(15) value in processor $31_{15}$, by accessing ω(16,15), accessing e[IN](16), multiplying the values together and adding the product to the processor $31_{16}$ running x(15) value.

FIG. 6 illustrates the control unit timing for the x updating step described above. The top signal illustrates a CIP system clock pulse as a function of time and the next 7 plots below the graph show the switch control values along lines C1 through C7 as a function of time. At time t between the first pulse and the second pulse, the switches are set in accordance with switch operation (a) above, sending ω(16,15) to feature processors $31_{15}$ and $31_{16}$ At time t+1, between the second pulse and the third pulse, the switches are set in accordance with switch operation (b) above, sending e[IN] (15) to processor $31_{16}$ after which processor $31_{16}$ adds the product between ω(16,15) and e[IN](15) to the running computed value of x(16). At time t+2, between the third pulse and the fourth pulse, the switches are set in accordance with switch operation (c) above, sending e[IN](16) to processor $31_{15}$, after which processor $31_{15}$ adds the product between ω(16,15) and e[IN](16) to the running computed value of x(15). After the fourth clock pulse, switches S2 and S3 will be open as indicated by their corresponding C2 and C3 control values being low, thus allowing other updating operations to occur without interference along the processor $31_{15}$ bus and the processor $31_{16}$ bus. Computing x proceeds such that each processor is computing a cross-product and adding the cross product to the running x sum of the processor, while each of the other processors is computing another cross-products and adding the product to the processor's x term.

With respect to updating the elements of ω, when updating ω(16,15) according to Equation (11), ω[IN](16,15), x(15) and x(16) are all first available in a single processor. Tile single processor then computes ω[OUT](16,15) according to equation (11), after which the processor sends the updated value to the storage cell for ω(16,15).

Figure 8:
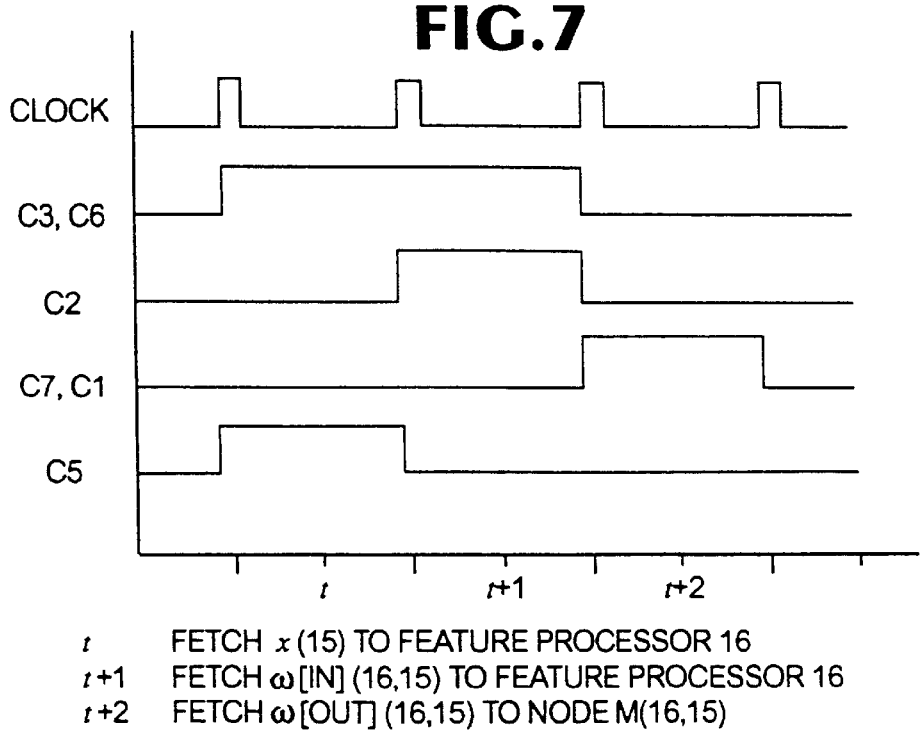
FIG. 8 shows timing diagrams for joint access memory control timing for updating operations associated with a switching junction of the joint access memory of the preferred embodiment of the present invention.

Referring to FIG. 8, control timing for the ω(16,15) updating sequence of operations is shown. The system clock pulses are shown as a function of time and the four plots below the clock pulse show control values along lines C1, C2, C3, C5, C6, and C7. At time t, the switches are set as discussed above in connection with switching operation (c), sending x(15) to feature processor 16. At time t+1, the switches are set as discussed above in connection with switching operation (d), sending ω (IN)(16,15) to feature processor 16, after which processor $31_{16}$ computes the second term of Equation (11). At time t+2, the switches are set as discussed above in connection with switching operation (e), sending ω(OUT)(16,15) to node M(16,15). (Other processor operations for completing Equation 11 are described below). After the fourth clock pulse, switches S2 and S3 are opened as indicated by their corresponding C2 and C3 control values being low, thus allowing other updating operations to occur without interference along the processor $31_{15}$ bus and the processor $31_{16}$ bus.

Figure 9:
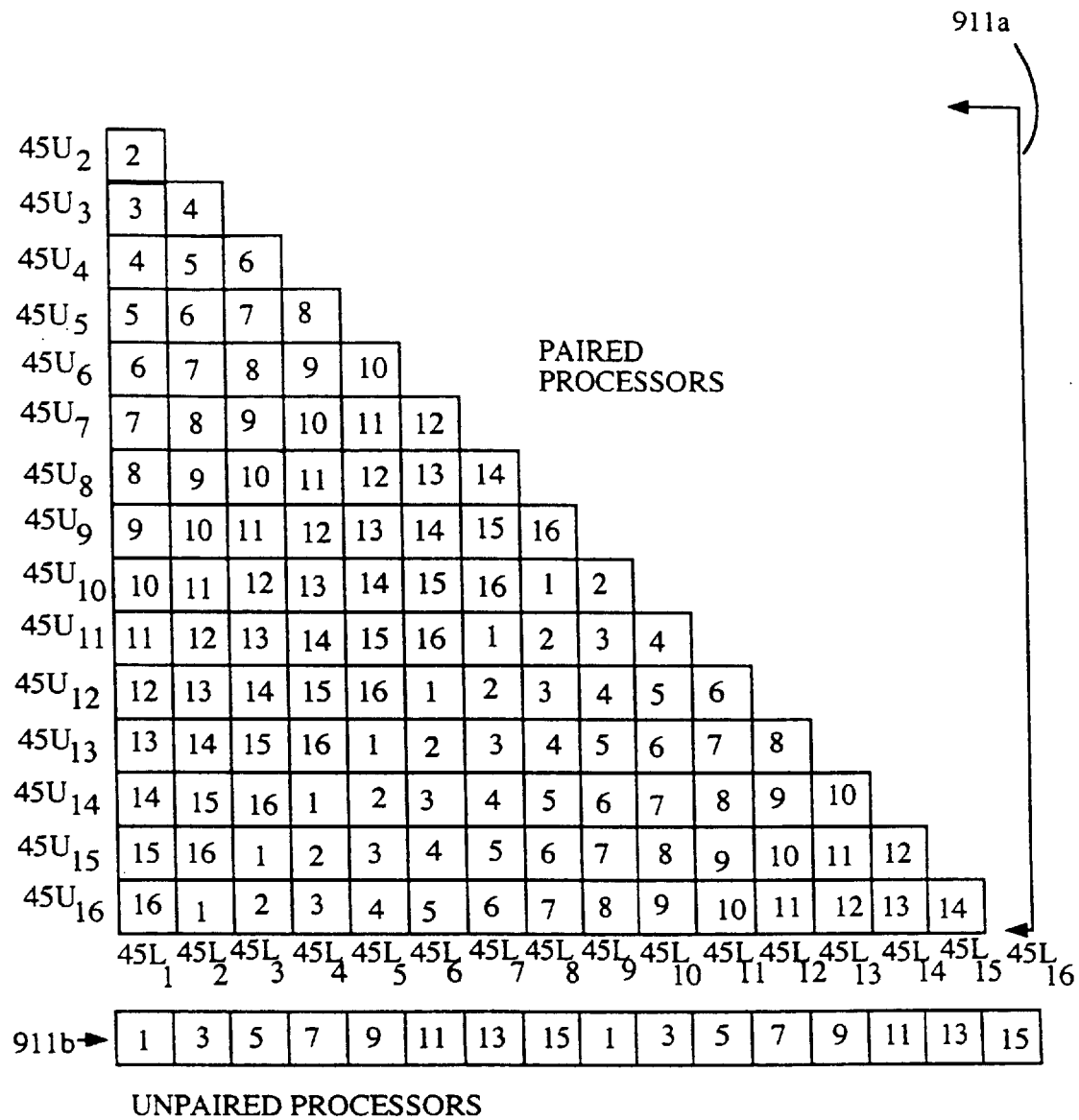
FIG. 9 shows processing time interval coordination for parallel embodiment of the preferred embodiment of the present invention.

Referring to FIG. 9, a coordination scheme for x and ω updating processor operations is shown. Each entry in FIG. 9 shows the time interval during which a processor is performing by itself or with one other feature processor at every interval in the overall x or ω updating process. The triangular table labeled as 911a has rows labeled $U_1$ through $U_{16}$ and columns labeled $L_1$ through $L_{16}$, which correspond to the rows and columns illustrated in the FIG. 5 joint access memory. The entries represent control timings as described below. The row table labeled as 911b has columns that correspond to the FIG. 5 feature processors $31_1$ through $31_{16}$. The entries represent control timings as described below. Entries in the table having the same numeric value represent the sets of processors that are uniquely paired during the time interval indicated by the table entry. The entries 911a indicate which processors are paired during every interval in the x updating process.

Feature processor pairing at any time interval is determined by locating in FIG. 9 the time interval along the processor's bus or within its processor. For example, the bus for processor $31_{16}$ corresponds to the bottom row in port 911a of FIG. 9. Examining that row shows that during time interval 1, feature processor 16 and feature processor 2 are updating x(16) and x(2) respectively, by using ω(16,2) along with e[IN](2) and e[IN](16), respectively. Control for this operation is same as the control for processors $31_{15}$ and $31_{16}$ was described above with reference to FIG. 7. Likewise, feature processor $31_{16}$ and feature processor $31_3$ are updating x(16) and x(3) during interval 2, feature processor 15 and feature processor 4 are updating x(15) and x(4) during time interval 2, and so on.

The entries 911b in FIG. 9 indicate which processors are performing operations but are not paired with another processor for that particular time interval. For example, at time interval 1 processor 1 is updating x(1) by adding e[IN](1)× ω[IN](1) to the processor $31_1$ running sum for x(1), while at the same time interval processor 9 is updating x(9) by adding e[IN](9)×ω[IN](9) to the processor 9 running sum for x(9). By accessing the processors and updating in the proceeding manner, the parallel CIP kernel is able to keep all of the feature processors busy throughout the x updating process.

The numbers in FIG. 9 form a systematic pattern that can be used to identify processor operation steps during x computations. The following formula identifies the processor g that is accessed by processor f during iteration i, as part of computing the matrix-vector product x during kernel step 2 (i,f, g=1, . . . , F):

$$g(i)=[F-f+i]\mod(F)+1. \tag{27}$$

For example, if F=16 then at time interval 2 (i.e., i=2), feature processor $31_{15}$ (f=15) will be interacting with processor 2 (g(i)=[16−15+2]mod(16)+1=[1]mod(16)+1=2).

The number patterns in FIG. 9 also indicate a systematic pattern of control lines that can be used to implement processor operations during x computations. For example, when using sixteen-features, each given time interval number in the sequence falls along a line from the lower left boundary of the 911a values in FIG. 9 to the upper right boundary. As a result, all corresponding joint access memory nodes along that line can share the same set of 3 control lines, because these control lines will share the same timing. Thus, the pattern of coordinating time intervals illustrated in FIG. 9 is representative of the pattern of control lines that is illustrated in FIG. 5.

The same coordination that is formulated in Equation (27) for computing x is used by the CIP system for updating the elements of ω, with one exception. While x updating implements the computing the operations indicted in FIG. 7 at each Equation (27) interval i, ω updating implements computing operations indicated in FIG. 8 at each Equation (27) interval i.

After x is computed, the values x(1) through x(F) and e[IN ](1) through e[IN]F will be residing in feature processors 1 through F, respectively. The Mahalanobis distance d is then computed according to Equation (14) as follows: first, the products x(1)×e[IN](1) through x(1)×e[IN](F) will be computed by processors 1 through F, simultaneously and in parallel; second, each such product will be sent to distance processor registers $D_1$ through $D_F$, as shown in FIG. 7, simultaneously and in parallel; third, the distance processor will sum the contents of registers $D_1$ through $D_F$ to obtain d, according to Equation (14); finally, the distance processor will return d to each of the feature processors through registers $D_1$ through $D_F$, for use by the processors in calculating the updated variance and updated connection weight matrix, in keeping with Equation (10) through Equation (12).

The design of the joint access memory and connected processors is advantageous for compact embodiment in highly integrated circuitry. A compact embodiment is advantageous for optimal speed during each trial. Thus, the kernel 21 is preferably implemented with as many feature processors and JAM elements as possible on a single chip. Otherwise, the parallel processing speed advantage may be negated by serial communication between chips. Also, shorter inter-component distances result in faster electrical signal transmissions between components.

The CIP parallel kernel also satisfies other design concerns: (a) a signal degradation concern (commonly known as fall-out)—minimizing the maximum number of inputs that a single feature processor of JAM elements supplies at any given time; and (b) a space utilization concern-minimizing the number of required conductors for communicating between feature processors and JAM elements. The CIP parallel kernel satisfies these various design concerns through the JAM bus and switching structure, along with parallel kernel feature processing coordination discussed above.

It should be appreciated by those skilled in the art that the kernel 21 can be implemented in analog circuitry. An alternative analog embodiment is implemented as follows: (a) each analog JAM bus is a single conductor instead of a collection of digital bit wires; (b) each digital JAM switch has only one contact instead of several contacts; (c) each digital JAM memory element is a small resistance-capacitive network instead of a much larger digital memory element; and (d) simple (1non-sequential) much larger digital memory element; and (d) simple (non-sequential) analog circuits are used to perform the arithmetic operations. Additionally, some of the above JAM analog operations can be combined with digital ALU operations to produce an analog-digital hybrid that is more compact and faster as well as acceptably accurate.

Sequential Kernel Operation

The sequential kernel utilizes the basic kernel operations that are discussed above in connection with the parallel kernel. Thus, sequential kernel operations produce the same outputs as parallel kernel operations whenever both kernel receive the same inputs. However, sequential operations will generally be slower, because they are obtained using only one processor instead of using F processors. Some of the sequential kernel operations are implemented in a different manner for efficiency, rather than identically simulating parallel kernel operations.

The x computing step and the ω[OUT] computing step of the sequential kernel operation are implemented for optional storage and speed. Both steps are based on storing the elements of ω as a consecutive string containing ω(1,1), followed by ω(2,1), followed by ω(2,2), followed by ω(3,1), followed by (3,2), followed by (3,3) and so on to ω(F,F). The x computing step and ω[OUT] computing steps access the consecutively stored elements of ω from the first element to the last element. The overall effect is to make both such steps far faster than if they were to be performed conventionally, using a nested loop. The sequence of operations for computing x and ω updating steps are discussed in connection with FIG. 19 and FIG. 20 below, respectively.

Parallel System Operation

Figure 10:
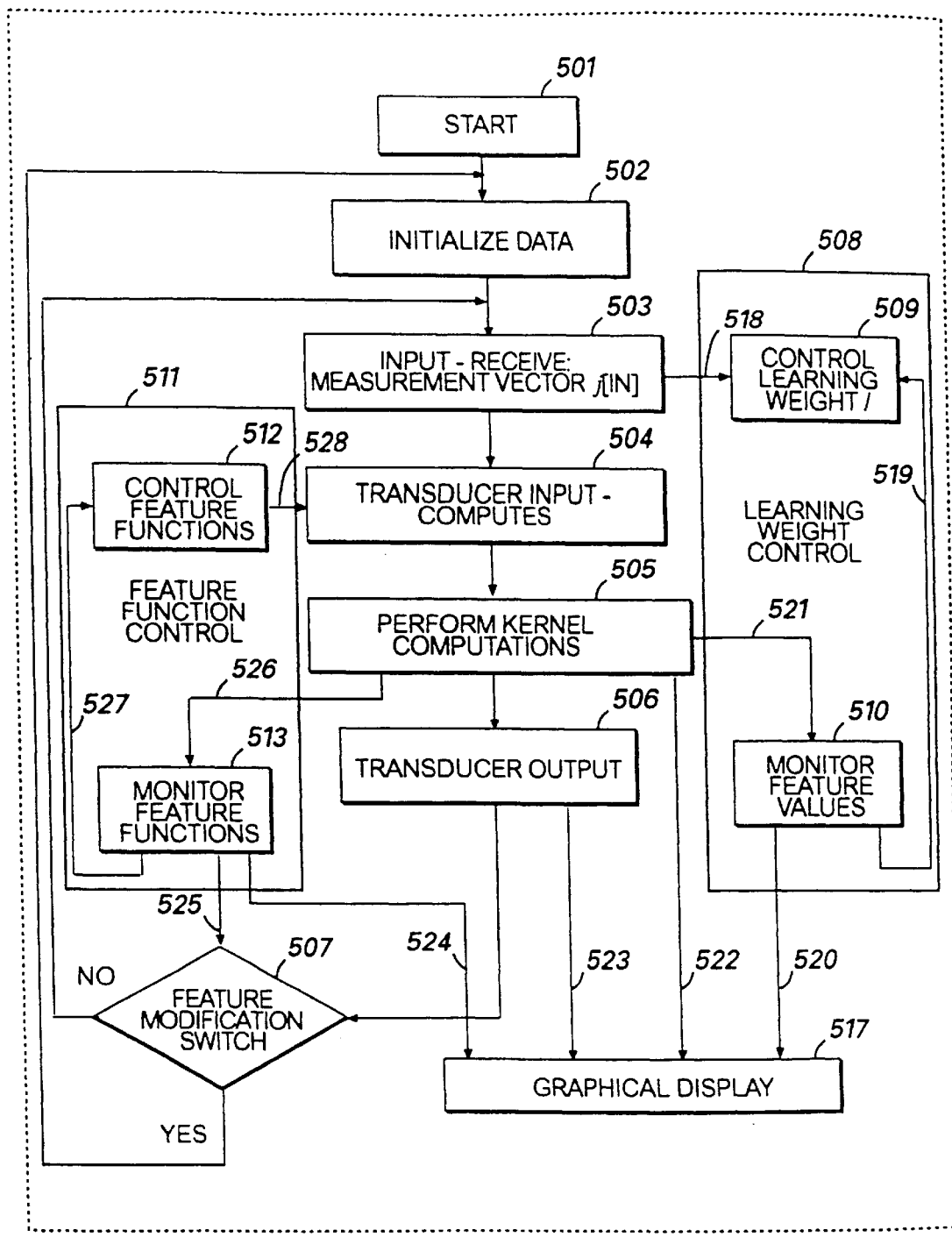
FIG. 10 shows a block diagram of the overall system implemented in the parallel embodiment of the preferred embodiment of the present invention.

Referring to FIG. 10, at the system level, separate subsystems can simultaneously perform: input transducer operations 504, kernel computations 505, learning weight controller operations 508, feature function controller operations 511, transducer output operations 506 and graphical display operations 517. The operations are of two types: concurrent operations and management operations. The concurrent processing operations are shown at 503, 504, 505, 506, and 507, while occasional management operations are shown at 502, 508, 511, and 517.

Referring to FIG. 10 and FIG. 2, concurrent operations, which are performed quickly during each trial, include transducer input operations 504 performed by the transducer input processor 24, kernel operations 505 performed by the kernel processor 24 and transducer output operations 506 performed by the transducer output processor 26. Buffer storage can make the output values from each device available as input values to the next device so that both devices can simultaneously operate on data for different trials at the same time. By utilizing buffering, kernel operations 505 may produce kernel output functions and learned parameter updating functions for the concurrent trial, while transducer input operations 504 are producing input features for the next trial and while transducer output operations 506 are producing imputed measurement values from the preceding trial.

Management operations, which can be performed occasionally over a period of several trials, include learning weight control operations 508 performed by the learning weight controller 40; feature function control operations 511 performed by the feature function controller 41; and graphical display operations 517. Buffering enables parallel management operations, and buffering enables parallel concurrent operations performed by the coordinator 38. During management operations, output information from the kernel 21 is made available as input information to the learning weight controller 40 via lines $40_1$ through $40_F$, $40_d$, and output information from the kernel 21 is made available to the feature function controller via 41 through $41_F$. Buffers are used so that management operations based on previous trial statistics in the buffer, can proceed while concurrent operations are continuing.

Within the learning weight controller 40 the feature values monitored during operation 510 are transmitted for learning weight control operation 509. Within the feature function controller 41, the outputs from the kernel are processed during feature function operation 513 and are transmitted to control feature functions during operation 512.

After kernel 21 output values are received in the buffers, the feature function controller 41 can perform the Equation 23 through Equation (25) computations and the learning weight controller 41 can performing the Equation (17) through Equation (19) computations. During the feature function controller operations 508 and learning weight controller operations 511, the kernel 21 continues its concurrent operations. The three operations 504, 505, and 506 thus proceed simultaneously.

Along with concurrent imputing, monitoring and learning operations, the CIP system occasionally monitors feature functions. The monitoring operations include receiving learned connection weight values and learned variance values from the kernel 21; computing feature multiple correlation values according to Equation (23); computing feature tolerance band ratio values according to Equation (24); and computing partial correlation values in keeping with Equation (25). After the feature function monitoring statistics have been computed, the statistics can either be: (a) provided to CIP users for manual interpretation and refinement via graphical display operations 517; or (b) used for CIP for automatic refinement 512 operations.

Changing feature specification is implemented by controlling the modification switching operation 507 as a result of monitor feature function operation 513. Triggering the switch operation 507 causes the CIP system 10 to reinitialize feature specifications through operation 502 as indicated.

Feature function monitoring statistics satisfying Equation (23) through Equation (25), along with learned means and learned connection weights can be interpreted in a straightforward way, because the CIP system utilizes quantum-counts, "easy Bayes", as discussed herein. Suppose that each learning weight from trial 1 to trial t, labeled by l(1) through l(t), is a ratio of quantum counts for each trial to the quantum counts for previous trials as follows: if the quantum counts for the initial parameter values along with features from trial 1 through t are labeled by q(0) through q(t), then $$l(1)=q(1)/q(0),$$

$$l(2)=q(2)/(q(0)+q(1))$$

.

.

.

$$l(t)=q(t)/(q(0)+q(1)+ \ldots +q(t-1)). \tag{28}$$

Suppose further that the initial mean vector is an average of q(0) quantum initial vectors, and input feature vectors m[IN] for trials 1 through t are averages of q(1) quantum vectors for trial 1 through q(t) quantum vectors for trial t, respectively. It then follows from statistical theory that all concurrently learned regression parameter values and all concurrently available refinement parameters can be interpreted as average statistics based on equally weighted quantum counts from an overall sample size of q(0)+q(1)+ . . . +q(t).

For example, the learned feature mean vector at the end of trial 10 has the interpretation of an average among q(0)+q(1)+ . . . +q(10) quantum values, and the learned feature mean vector after any other number of trials has the same interpretation.

As a second example, equal impact sequences satisfying Equation (20) through Equation 22) can be generated by setting q(1) =q(2)=q(3)=R, where R, is a positive constant; in that case, from algebra based on Equation (28), l(1)=1/R, l(2)=1/(R+1), l(3)=1/(R+2) and so on as in Equation (20) through Equation (23), where R+q(0)/R$_1$. Thus, Equation (28) provides a quantum-observation interpretation for equal-import learning by the CIP System, as well as a derivation for equal-import CIP sequences that satisfy Equation (20) through Equation (23).

As a result of using quantum-counts, "Easy Bayes," used by the CIP system, feature regression parameters and feature function monitoring parameters can be concurrently evaluated from trial to trial and may be implemented more easily than alternative parameters that are available from either conventional statistics procedures or conventional neuro-computing procedures.

As discussed above, the parallel CIP system can operate more quickly through the use of buffered communication. Also, discussed above, implementing as many CIP operations as possible on one chip can avoid considerable inter-chip communication time loss. As a result, implementing several CIP subsystems on different layers of a single chip and communicating between the layers through parallel buffering can maximize overall CIP operation speed.

Figure 11:
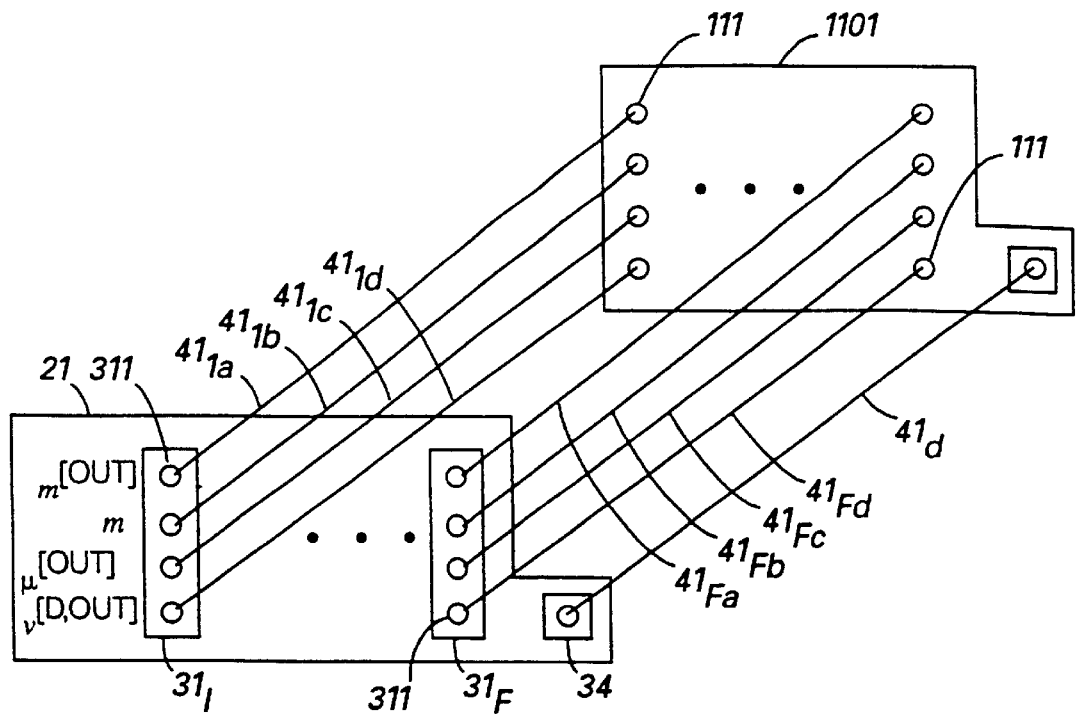
FIG. 11 shows a block diagram of the overall system implemented in the sequential embodiment of the preferred embodiment of the present invention.

FIG. 11 shows memory locations 311 within parallel kernel features processors $31_1$ through $31_F$ that are accessed by the learning weight controller 40; the learning weight controller buffer 1101; and corresponding buses $41_{1a}$ through $41_{Fd}$ to the learning weight controller buffer 1101. As shown in FIG. 11, the buffer elements 111 are geometrically configured in the same manner as kernel 21 memory locations, correspond to respective parallel kernel memory locations and may be aligned in parallel to the kernel memory locations as shown. The parallel structure of the buffer with respect to kernel 21 memory locations enables the buffer to reside on a layer above or below the parallel kernel with minimal wiring.

Figure 12:
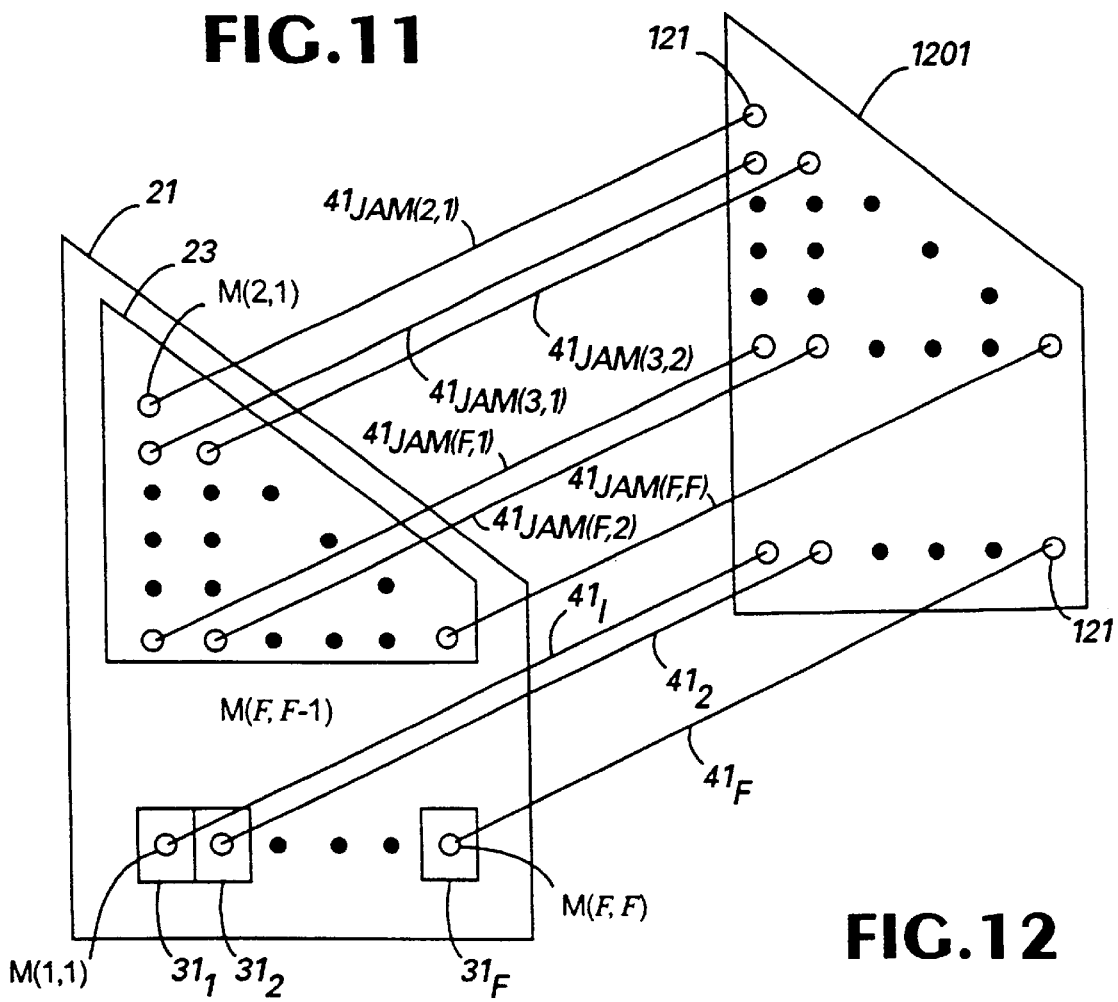
FIG. 12 shows communication connections for a controller used in the parallel embodiment of the preferred embodiment of the present invention.

Referring to FIG. 12, buffering to the feature function controller is shown. FIG. 12 shows: memory locations 411 within parallel kernel feature processors that are accessed by the feature function controller 41; the feature function controller buffer 1201; and corresponding buses $41_{JAM(2,1)}$ through $41_{JAM(F,F)}$ and $41_1$ through $41_F$ to the feature function controller buffer 1201. As illustrated in FIG. 11, the buffer elements in FIG. 12 are configured in the same manner as kernel 21 memory locations, correspond to respective parallel kernel memory locations and aligned in parallel to the kernel 21 memory locations. The buffer may reside on a layer above or below the parallel kernel with minimal wiring requirements.

The geometrically aligned buffering in FIG. 11 and FIG. 12, in conjunction with multiple layer chip designs, enables CIP subsystems to reside on a single chip or a single array of aligned chips. As a result, time-consuming communication time within the system is minimized.

Sequential System Operation

Figure 13:
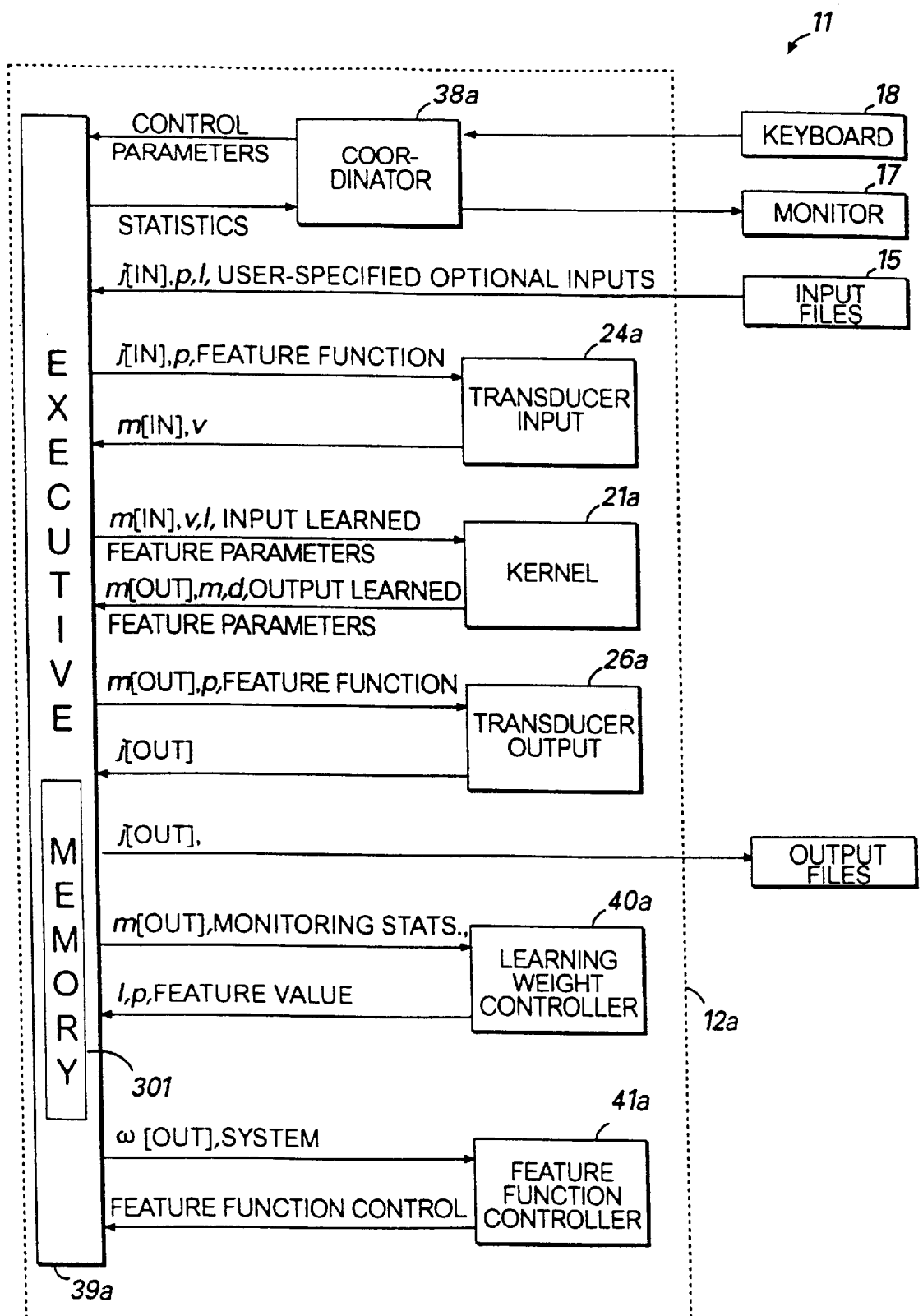
FIG. 13 shows communication connections for another controller used in the parallel embodiment of the preferred embodiment of the present invention.
Figure 14:
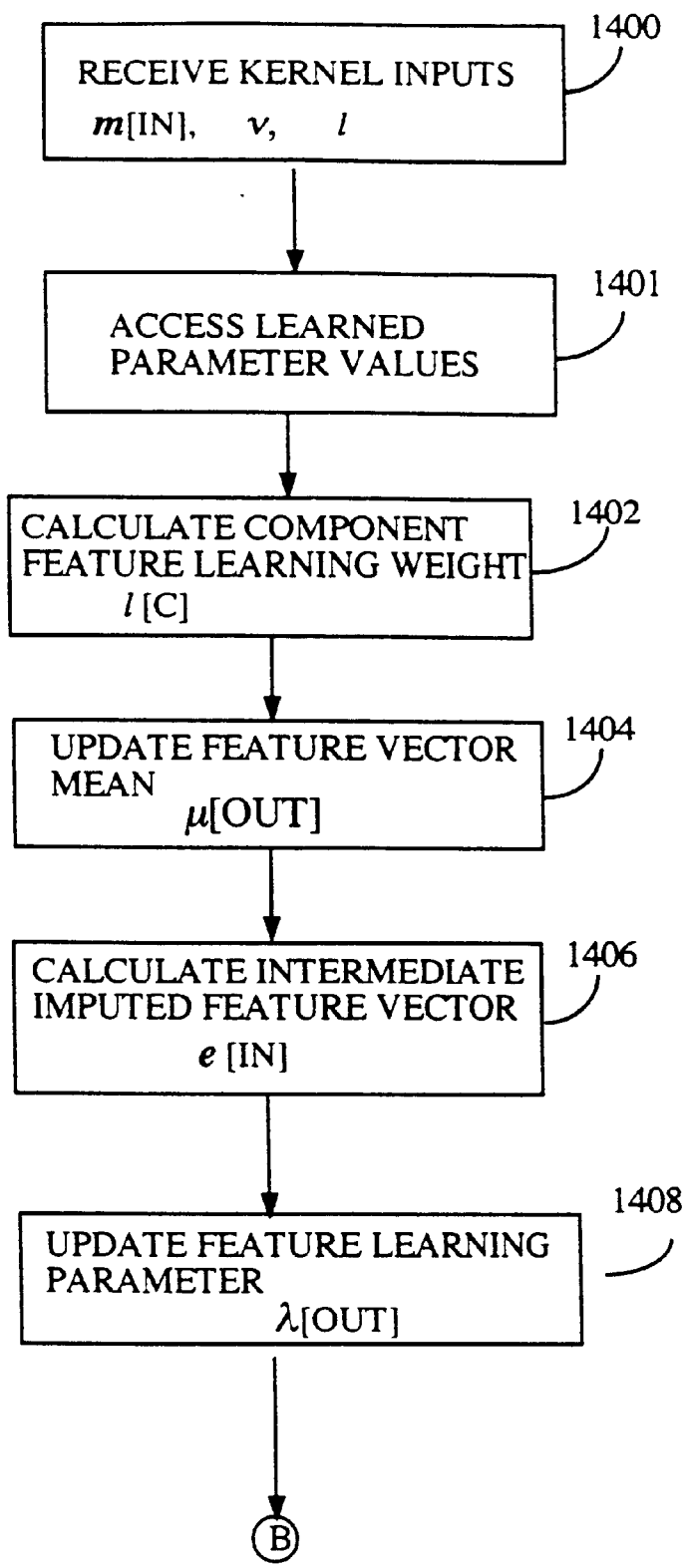
FIGS. 14 through 22 are flow diagrams showing preferred steps for the processes implemented by the preferred embodiment of the present invention.

Referring to FIG. 13, the subsystems of the sequential kernel are shown. FIG. 13 shows more specifically than FIG. 3, the vectors and parameters that are transferred among the subsystems. The various inputs and outputs of the learning weight controller 40a, feature function controller 41a and coordinator 38a are shown. The various monitored parameters and control functions implemented by the sequential system are the same as with the parallel system except that the transfer of relevant data occurs sequentially.

The sequential CIP system can perform all operations associated with the parallel system discussed above, although not as fast, because only one CIP operation is performed at time using a single available processor. Also, at the subsystem level simultaneous operations are not implemented as in the parallel kernel embodiment, because only one processor is available for kernel operations.

Beyond speed concerns, however, the CIP system is no less powerful when implemented sequentially than it is when implemented using parallel processors. Also, the sequential CIP embodiment has at least two advantages over parallel embodiment: the sequential embodiment is generally less expensive because it may be embodied in a conventional computer rather than specially designed parallel circuits; and sequential embodiment can accommodate many more features per trial on conventional computers than the parallel embodiment can accommodate on specialized circuits. As a result, the sequential CIP embodiment is useful, in applications where trial occurrence rates are low relative to the number of features per trial.

Alternative Kernel Implementations

Alternative operations of the kernel include: (1) updating a coefficient matrix that is used by the Davidon-Fletcher- Powell (DFP) numerical optimization algorithm; (2) multiplying a symmetric matrix by a vector; (3) adjusting the connection weight matrix for deleted features during feature function control; and (4) training the kernel to become an input transducer. All four related applications are discussed below based on kernel modifications.

Beginning with the numerical optimization application, the DFP method is one of several iterative methods for finding the maximum (or minimum) independent variable values for a function of several variables. Numerical optimization methods are generally useful but are also generally slow. For example, numerical optimization methods are used to find optimum values associated with five-day weather forecasts, but generally take many hours to converge, even on supercomputers. Among the numerical optimization methods, the DFP is especially useful in a variety of applications, because the DFP method learns derivative information during the iterative search process that may not be readily available.

Just as the parallel kernel process is used to implement a fast concurrent information processing system, a modified version of can be used for a fast new numerical optimization system. In particular, if sequential DFP updating based on F independent variables takes s seconds for convergence to an optimal solution, then parallel DFP updating will require only about s/F seconds to converge. For example, suppose that five-day weather forecasting required optimizing a function of 2,000 variables, which in turn took 20 hours to converge using the conventional (sequential) DFP method. If the same optimization problem could be solved with a parallel counterpart to the DFP method resembling the parallel Kernel, convergence would take about 18 seconds.

The DFP method continuously updates the inverse of a matrix as part of normal operation. Instead of updating the inverse of a covariance matrix as in the CIP system, the DFP algorithm updates the inverse of an estimated matrix of second-order derivatives, which is called the information matrix. Although the formula for updating the DFP inverse is distinct from the formula for updating the CIP inverse, an extension to the parallel CIP kernel algorithm can be used for DFP updating. The DFP information matrix inverse updating formula is, $$\omega[DFP,OUT]=\omega[DFP,IN]-c[DFP]x[DFP]^T x[DFP]+b[DFP]y[DFP]^T y[DFP], \quad (29)$$

where $$c[DFP]=1/d[DFP], \quad (30)$$

$$x[DFP]=e[DFP]\omega[DFP,IN], \quad (31)$$

$$d[DFP]=e[DFP]\omega[DFP,IN]e[DFP]^T \quad (32)$$

and $$b[DFP]=x[DFP]y[DFP]^T. \quad (33)$$

The DFP Kernel updating formulas (29) through (33) may be tailored to suit DFP updating. In particular, the DFP counterpart to the kernel process utilizes the same number of steps, as the parallel CIP kernel 21; the DFP counterpart computes Equation (29) just as the parallel CIP kernel computes Equation (11); the DFP counterpart computes its distance function satisfying Equation (32) and its inner product function satisfying (33) just as the parallel CIP kernel computes its distance function satisfying Equation (14); and the DFP counterpart computes its matrix-vector product satisfying Equation (31), just as the parallel CIP kernel 21 computes its matrix-vector product satisfying Equation (13). The differences between the two parallel methods are: (a) the DFP constant in Equation (29) is simpler than its corresponding parallel CIP kernel Equation (12)(b); the DFP counterpart solves two inner products to compute Equations (32)(c) and (33) instead of a single parallel CIP kernel inner product to compute Equation (14); and the DFP counterpart computes terms for two outer products to compute the second and third terms in Equation (29) instead of a single corresponding parallel CIP kernel outer product operation to compute the second term in Equation (11).

A less computationally involved tailored kernel embodiment may be implemented where multiplication of a symmetric matrix by a vector is performed repeatedly and quickly. The kernel embodiment may be simplified to compute such products, of which Equation (13) is one example, by preserving only operations that are needed to compute such products and removing all others. As with the parallel CIP kernel embodiment and all other tailored versions, using parallel processing instead of sequential processing will produce results that are faster by about a factor of F.

Regarding tailored kernel counterparts within the CIP system, the feature removal adjustment formula (26) is a simplified version of the kernel updating formula (11), in that: (a) the Equation (26) second term constant coefficient does not utilize a distance function, and (b) only an outer product among 2 vectors is needed to compute the Equation (26) second term, without first requiring a matrix-vector product as in Equation (13). As a result, the parallel CIP kernel can be simplified to solve Equation (26).

Regarding tailored parallel CIP kernel operations for feature function modification and input transducer processing, "student input transducers" can first be "taught" to use only useful features, after which the operations can be used to produce features. For example, suppose that a CIP system is needed to forecast one dependent variable value feature 1 as a function of several independent variable values for feature 2 through feature 100. During a series of conventional learning trials a modification of the kernel process can learn to identify the 99 optimal connection weights for imputing feature 1 from feature 2 through feature 100. After the learning has occurred, the trained module can be used in place of an input transducer having 99 inputs corresponding to features 2 through 100 and only one output corresponding to feature 1. When used as an input transducer, the module would differ from the kernel in that the module's learning and updating operations would be bypassed. Thus, the only modifications of the kernel needed to implement such a module are an input binary indicator for learning versus feature imputing operation, along with a small amount of internal logic to bypass learning during feature imputing operation.

PROCESSES OF THE CIP SYSTEM

Referring to FIG. 14 through FIG. 17, the preferred steps of the parallel CIP kernel processes implemented in the present invention are shown. The steps of the processes illustrated in FIGS. 14 through 17 all occur in the parallel kernel 21 subsystem of the CIP system 10. At step 1400, as noted above, the kernel receives a learning weight /, a feature vector m[IN] and a viability vector v when initial processing begins by the kernel 21. At step 1401, the kernel accesses learned parameter memory elements that include a mean vector $\mu$[IN], $\omega$[IN], v[D,IN], $\lambda$[IN], and $\mu$[IN] values. Each of the $\mu$[IN], $\omega$[IN], v[IN], and $\lambda$[IN] values were calculated as outputs stored in learned parameter memory during the previous trial. If, however, this is the initial CIP system iteration, then the $\mu$[IN] values are zero, the $\omega$[IN] values correspond to the identity matrix, and the $\mu$[IN] values as well as the v[D,IN] values are one.

At step 1402, the kernel calculates a component feature learning weight from the viability vector v, the global learning weight l and the learning history parameter $\lambda$[IN] values according to Equation (3). The process then proceeds to step 1404. At step 1404, the feature mean vector m[IN] is updated according to Equation (2). At step 1406, the intermediate imputed feature vector e[IN] is calculated according to Equation (9). At step 1408, the learning history parameter $\lambda$[OUT] is updated according to Equation (4). The process then proceeds to B of FIG. 15.

Figure 15:
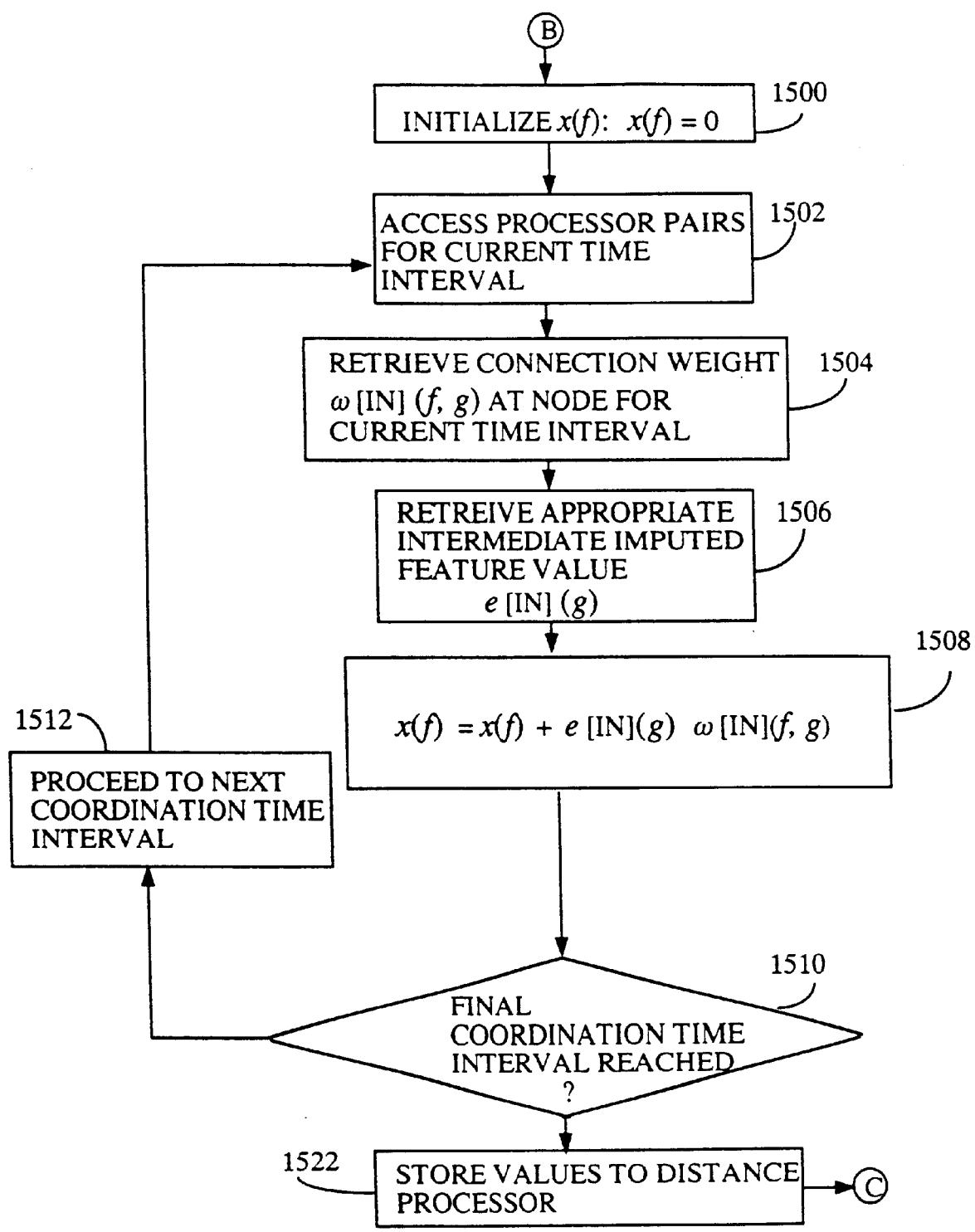

Referring to FIG. 15, a discussion of the preferred steps of the processes of the preferred embodiment of the present invention continues. FIG. 15 illustrates the preferred process by which the intermediate matrix/vector product is calculated as discussed above. At step 1500, each element x(f) of intermediate matrix/vector product is initialized to zero and the process proceeds to step 1502. At step 1502, the kernel begins to access the processor pairs according to the coordination time scheme discussed above in conjunction with FIG. 9. At step 1504, each paired processor f retrieves the appropriate connection weight $\omega$[IN]($\omega$, g) at the joint access memory switching node. Similarly, at step 1506 the appropriate intermediate imputed feature value e[IN](g) is retrieved as discussed in connection with FIG. 7. At step 1508, the element x(f) is incremented by the cross product as discussed above.

The process proceeds to step 1510 where a determination is made as to whether the final coordination time interval for the coordination time scheme has been reached. If the final coordination time interval has not been reached, then the process proceeds to the next time interval at step 1512 after which follows a reiteration of steps 1502 through 1508. The reiteration of steps 1502 through 1508 produces the running sum for the calculation of x(f) If at step 1510, the final connection time interval has been reached, then at step 1522 calculated values are stored to the distance processor as discussed above. The process then proceeds to C of FIG. 16.

Figure 16:
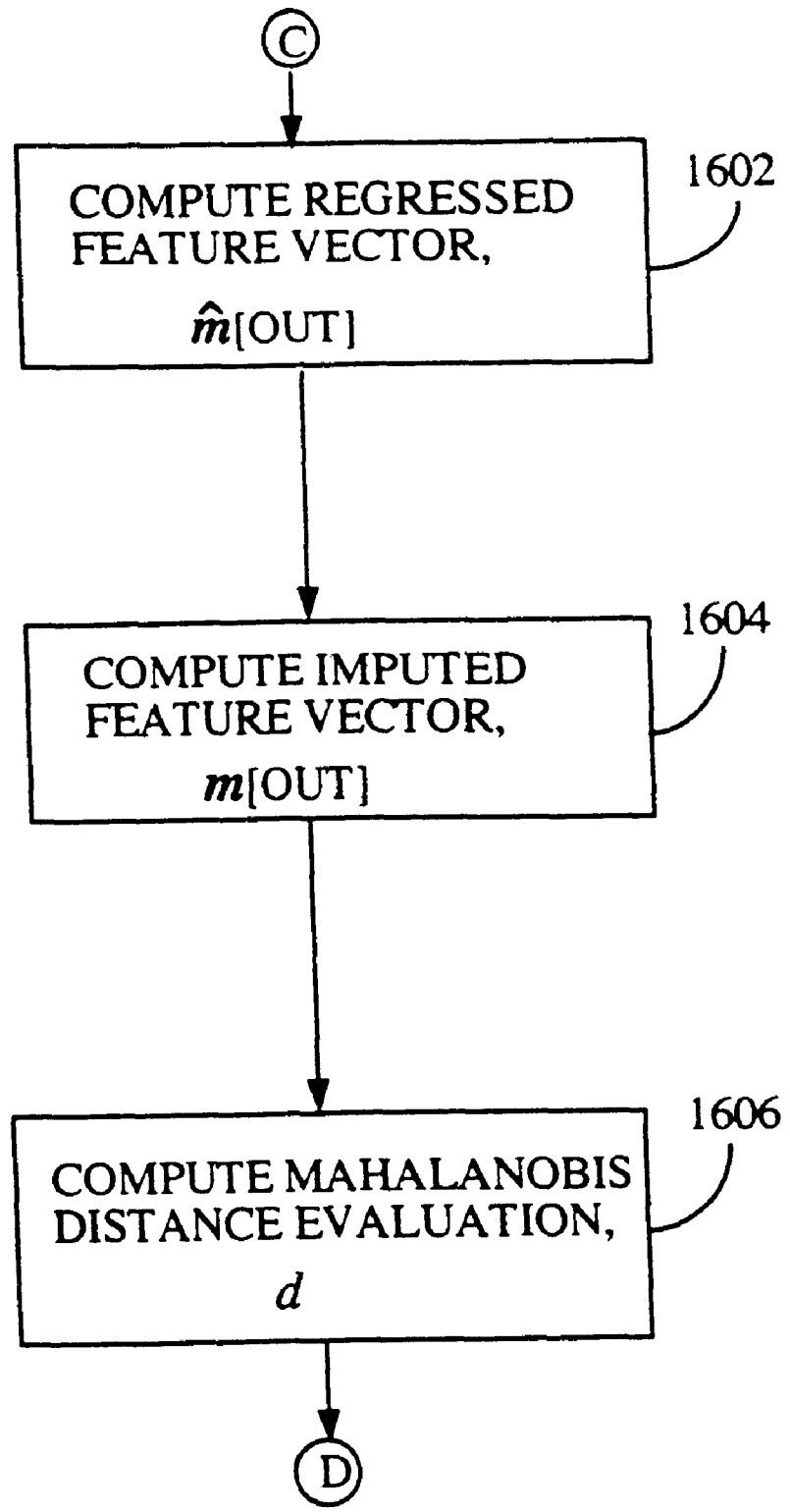

Referring to FIG. 16, the steps of the preferred embodiment of the present invention that compute the output values of the kernel subsystem 21 are shown. At step 1602, the output regressed feature vector m[IN] is computed according to Equation (17).

The imputed feature vector m[OUT] is then computed at step 1604 according to Equation (16). The process then proceeds to step 1606. At step 1606, the distance processor calculates the Mahalanobis distance value at the distance ALU 34 according to Equation (8). As noted above, each processor stores to the distance processor the distance value cross-product calculated by the particular processor. After receiving each of the cross-product values from all of the processors, the distance processor sums all of the distance values provided by the feature processors to obtain the distance measure d. The process then proceeds to D of FIG. 17.

Figure 17:
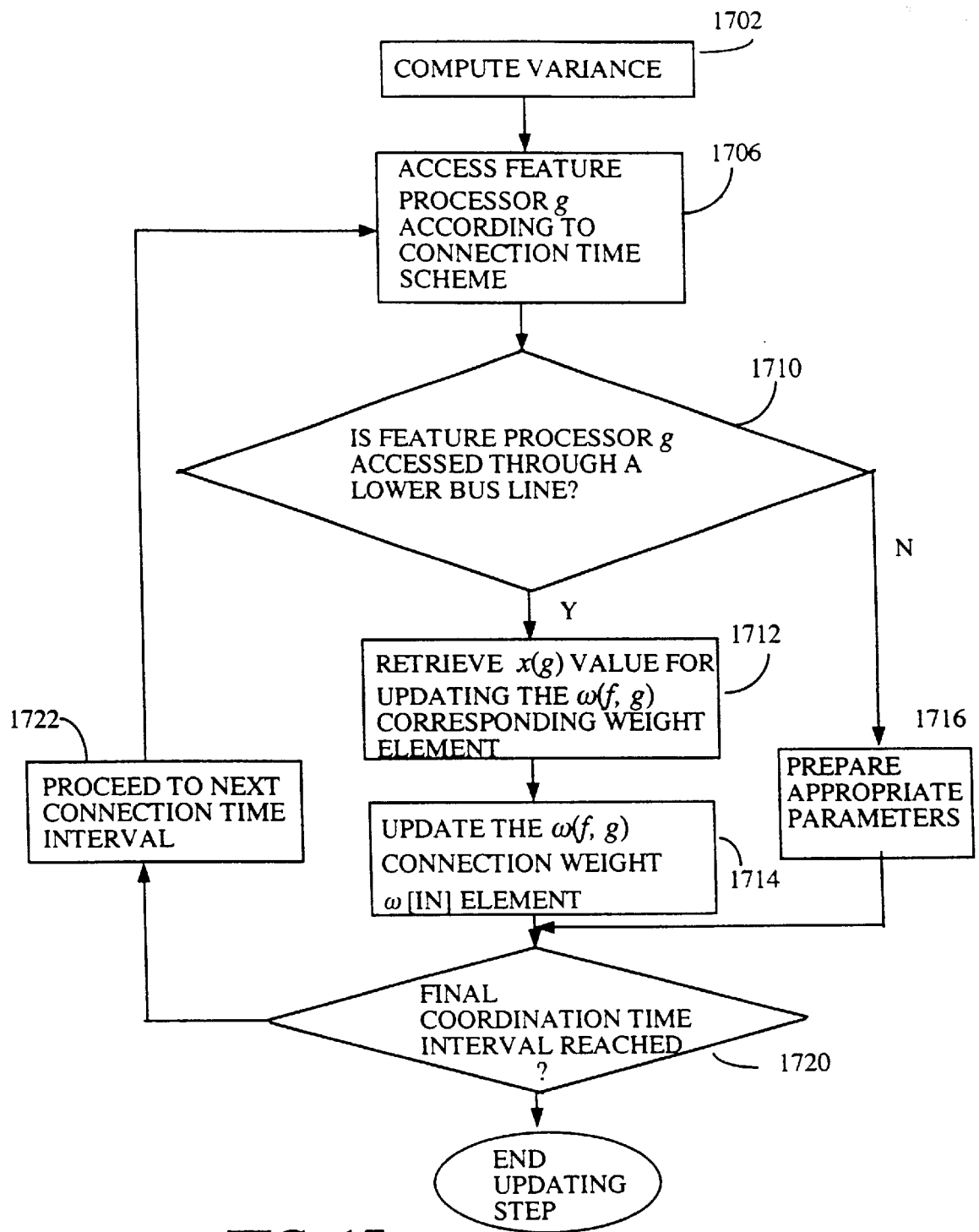
Figure 18:
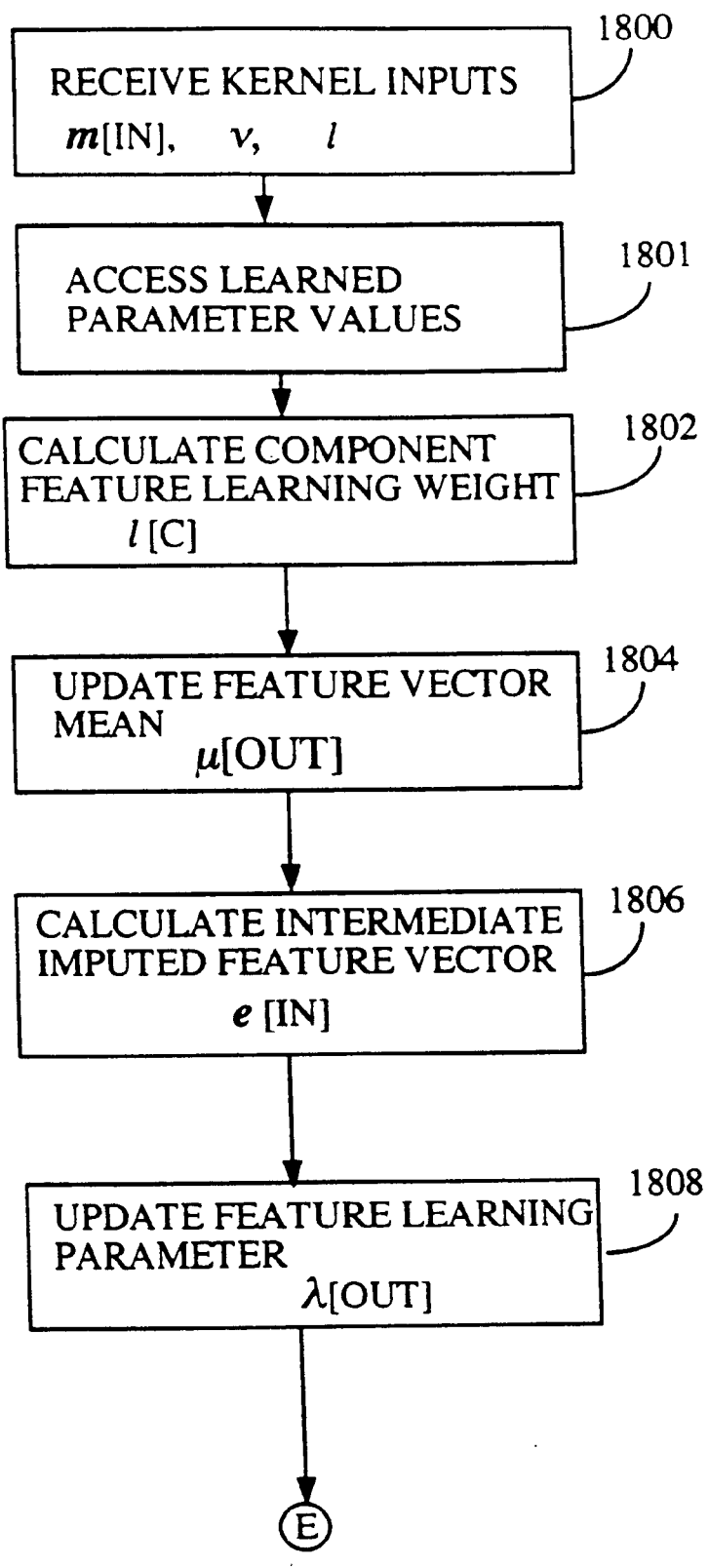

Referring to FIG. 17, the steps of the processes for updating the connection weight matrix element $\omega$(f, g) in the preferred embodiment of the present invention are shown. At step 1702, the variance v[D](f) is calculated according to Equation (10). The process then proceeds to step 1706, where processor g is accessed by processor F according to the connection time scheme discussed above in connection with FIG. 9. At step 1710, a determination is made as to whether the processor g is being accessed through a lower bus lines. (See FIG. 8.) If the processor is being accessed through the lower bus for processor g, then the process of processor f proceeds to step 1712. At step 1712, the intermediate matrix/vector product x(g) is retrieved for the processor f. At step 1714, the appropriate connection weight element, which corresponds to the memory element located at the node of the currently paired processors, is updated according to Equation (11) by processor f.

At step 1720, the kernel determines whether the final connection time interval for the coordination time scheme has been reached.

If the final interval for the coordination time scheme has not been reached, then at step 1722 the kernel proceeds to the next coordination time interval. Following step 1722, steps 1706 through 1720 are repeated.

If at step 1710, the processor g is being accessed through an upper bus for processor g then the processor f produces outputs for the concurrent trial and reads inputs for the next trial. The process proceeds from step 1716 to step 1720 which was discussed above. If at step 1720, the final connection time interval of the connection time scheme has been reached, then the kernel functions end for the current trial.

Referring to FIG. 18 through FIG. 21, the preferred steps of the sequential CIP kernel 21*a* for processes implemented in the present invention are shown. The steps of the processes illustrated in FIGS. 18 through 21 all occur in the sequential kernel 21*a* subsystem of the CIP system 11. At step 1800, as noted above, the sequential kernel 21*a* receives a learning weight l, a feature vector m[IN] and a viability value v when initial processing begins, by the kernel 21*a*. At step 1801, the kernel accesses learned parameter memory elements that include a $\mu$[IN] values, $\omega$[IN] values, v[D,IN] values and $\lambda$[IN]. Each of the $\mu$[IN], $\omega$[IN], and l[IN] values were calculated as outputs stored in learned parameter memory during the previous trial. If, however, this is the initial CIP system iteration, then each $\mu$[IN](f) value equals zero, the $\omega$[IN] values correspond to the identity matrix, and the $\lambda$[IN] values as well as the v[D,IN] values are one.

At step 1802, the kernel calculates a component feature learning weight from the viability vector v, the global learning weight l, and the $\lambda$[IN] value according to Equation (3). The process then proceeds to step 1804. At step 1804, the feature mean vector is updated according to Equation (2). At step 1806, the intermediate imputed feature vector e[IN] is calculated according to Equation (9). At step 1808, the learning history parameter $\lambda$[OUT] is updated according to Equation (4). The process then proceeds to E of FIG. 19.

Figure 19:
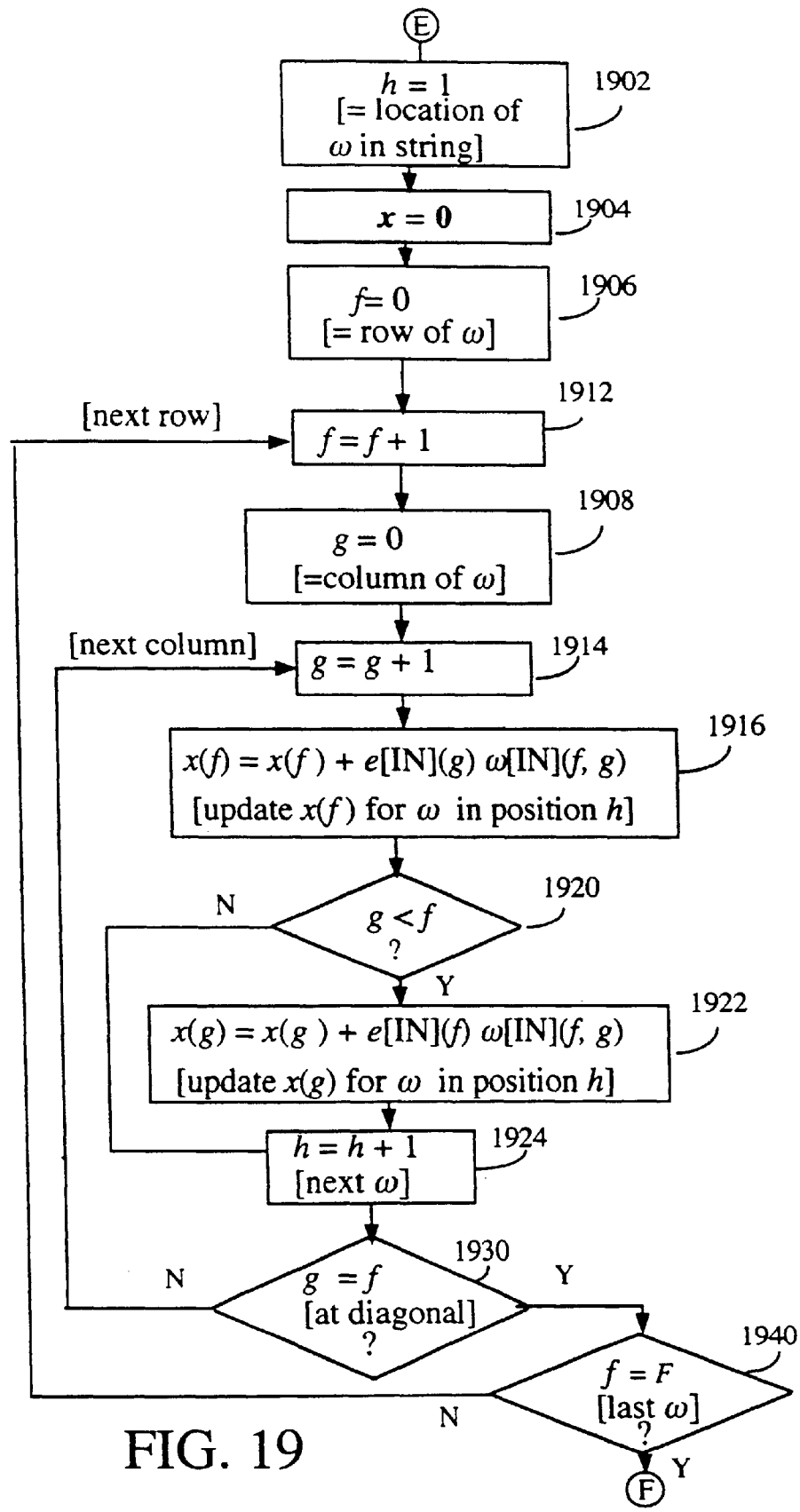

Referring to FIG. 19, the preferred steps of the sequential CIP kernel processes implemented in the present invention for computing the intermediate matrix/vector x are shown. The process discussed in connection with FIG. 19 provides a method of calculating the intermediate matrix/vector x without performing a conventional double loop (i.e., one loop for all possible row values of a matrix and one loop for all possible column values of a matrix). The matrix $\omega$ elements are stored in a single string in consecutive order corresponding from $\omega$(1,1) to $\omega$(2,1) to $\omega$(2,2) to $\omega$(3,1) to $\omega$(3,2) to $\omega$(3,3) and so on to $\omega$(F, F). At step 1902, the location h of the first $\omega$ element is initialized to one. At step 1904, the intermediate/matrix vector x is set to zero. The process then proceeds to step 1906 where the row value f, that corresponds to $\omega$ elements stored in matrix form is set to zero. The process then proceeds to step 1912 where the row value is incremented by one. At step 1908, the column value g corresponding to the ω element as stored in matrix form is next set to zero. The process then proceeds to step 1914 where the column value g is incremented by one. The process then proceeds to step 1916 where the running sum for computing the intermediate matrix/vector product ω(f,g) times the corresponding x(f) is incremented by the current intermediate imputed feature vector e[IN](g) for column g.

At step 1920, a determination is made as to whether the column value g, is less than the row value f. If the corresponding column value g is not less than the row value f, indicating that the ω(f,g) element is on the main diagonal of the connection weight matrix, the process then proceeds to step 1924 where the location h of the element is incremented by one. The process then proceeds to step 1930 where a determination is made as to whether the row value f equals the column value g, which indicates that the ω element resides on the main diagonal of the connection weight matrix ω[IN]. Here, if the column value is less than the row value, indicating that the more elements of ω are contained in the corresponding row, then the process proceeds to step 1914 where the column value a g is incremented by one and the process proceeds to step 1916 as discussed above.

At step 1920, if the row value equals the column value then, at step 1922, the running sum for computing the intermediate matrix/vector product x(g) is incremented by the current ω(f,g) element times the corresponding intermediate imputed feature vector e(f) for column f. The process then proceeds to step 1924 where the location h of the ω element is incremented by one in order to access the next ω element. If at step 1930 the row value equals the column value then, the process proceeds to step 1940. At step 1940, determination is made as to whether the row value equals the total number of features for the system. If the row value does not equal the total number of features, which indicates that all 107 values have not been evaluated, the process then proceeds to step 1912 and the process follows as discussed above. If at step 1940, the row value does equal the number of features, indicating that all ω values have been evaluated then the process proceeds to F of FIG. 20.

Figure 20:
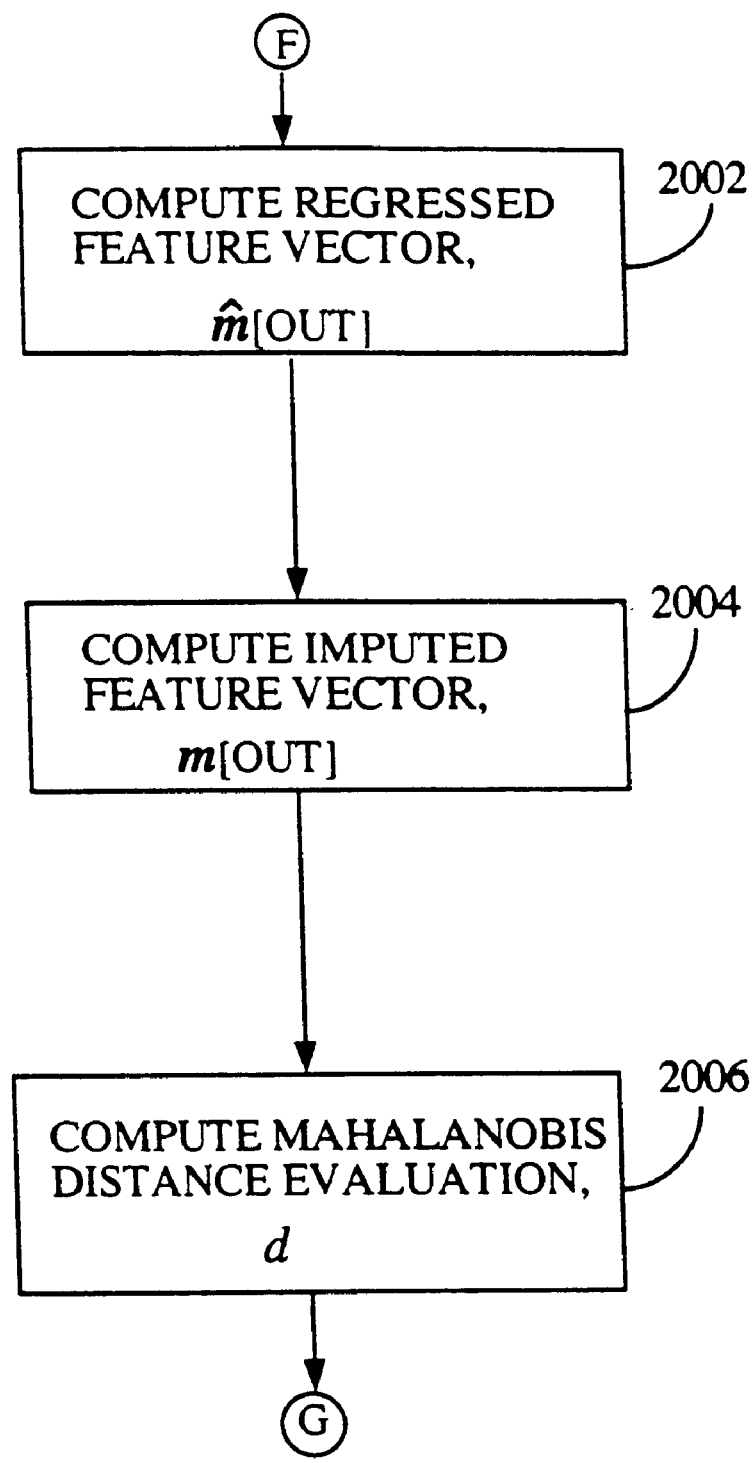

Referring to FIG. 20, the steps of the preferred embodiment of the present invention which compute the output values of the sequential kernel subsystem 21a are shown. At step 2002, the output regressed feature vector is computed according to Equation (17).

The imputed feature evaluation m[OUT] is then computed at step 2004. The process then proceeds to step 2006. At step 2006, the distance ALU calculates the Mahalanobis distance value at the distance processor according to Equation (8). As noted above, each processor stores to the distance processor the distance value calculated by the particular processor. After receiving each of the cross-product values from all of the processors, the distance processor sums all of the distance values provided by the feature processors to obtain the distance measure d. The process then proceeds to G of FIG. 21.

Figure 21:
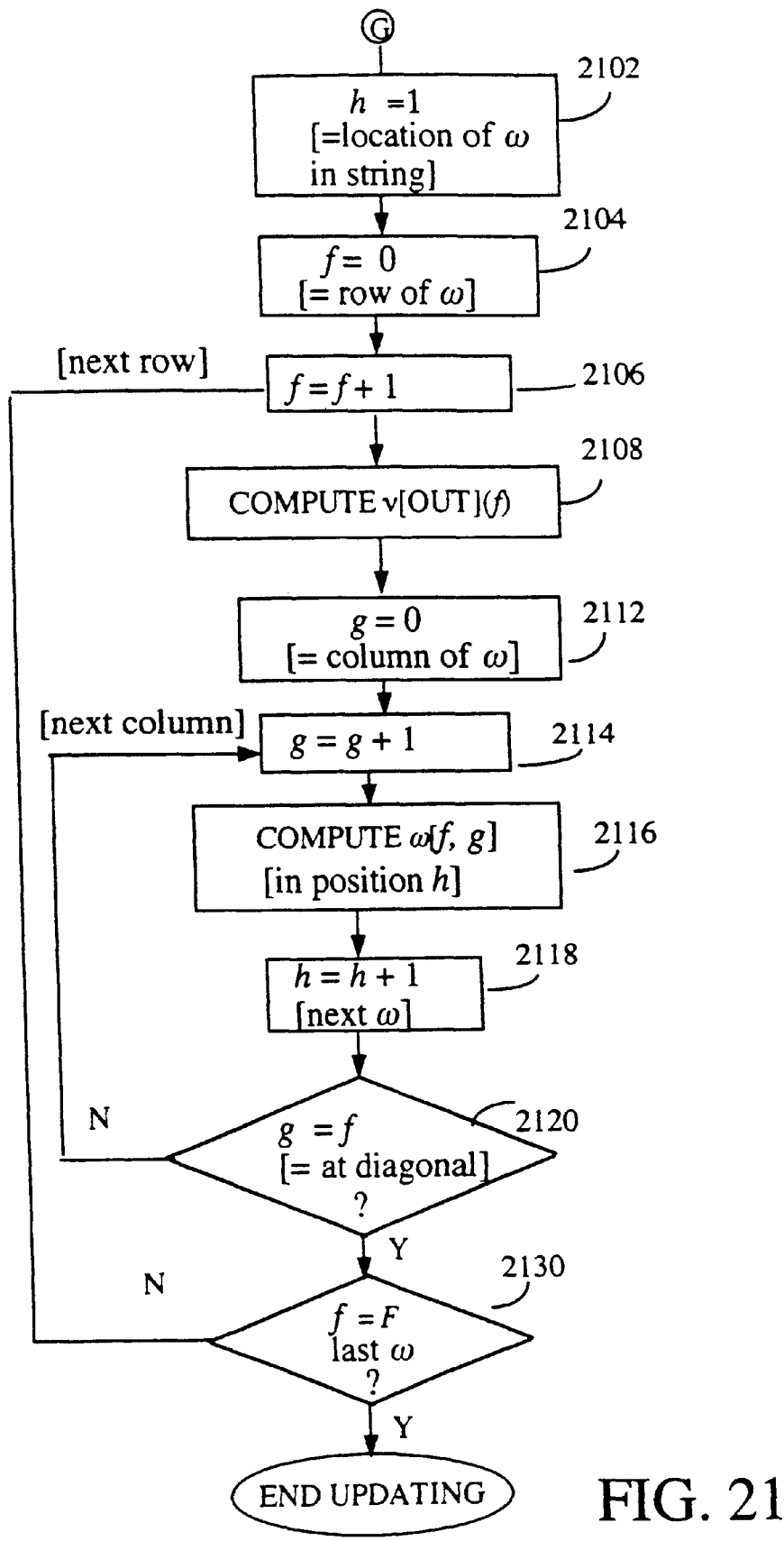

Referring to FIG. 21, the steps of the process for updating ω for the sequential kernel processes are shown. At step 2102, the location of the ω element in the sequence of ω elements is initialized to one. At step 2104, the row value corresponding to the ω element in the string is initialized to zero. The process then proceeds to step 2106 where the row value f is incremented by one. The process then proceeds to step 2108 where the variance element v[D,OUT] is updated with respect to the current row f value. The process then proceeds to step 2112 where the column value g is initialized to zero. At step 2114, the column value g is incremented by one. The process then proceeds to step 2116 where the connection weight element of ω is updated according to Equation (11). The process then proceeds to step 2118. At step 2118, the c) location value h is incremented by one in order to access the next ω element in the string. At step 2120, a determination is made as to whether the column value a equals the row value f If the column value g does not equal the row values then further ω elements corresponding to that row remain to be updated and the process proceeds to step 2114 and completes steps 2116 and 2118 as discussed above.

If at step 2120 the column value g equals the column value f indicating that an f element that corresponds to the main diagonal has been reached and the process proceeds to step 2130. At step 2130, a determination is made as to whether the row value f equals the number of features. If the row value does not equal the number of features then the process proceeds to step 2106 where the row value is incremented and the process then proceeds as discussed above in connection with the previous steps outlined. If at step 2130, the row value f does equal the number of features then the updating process has ended, then kernel functions end for the current trial.

Figure 22:
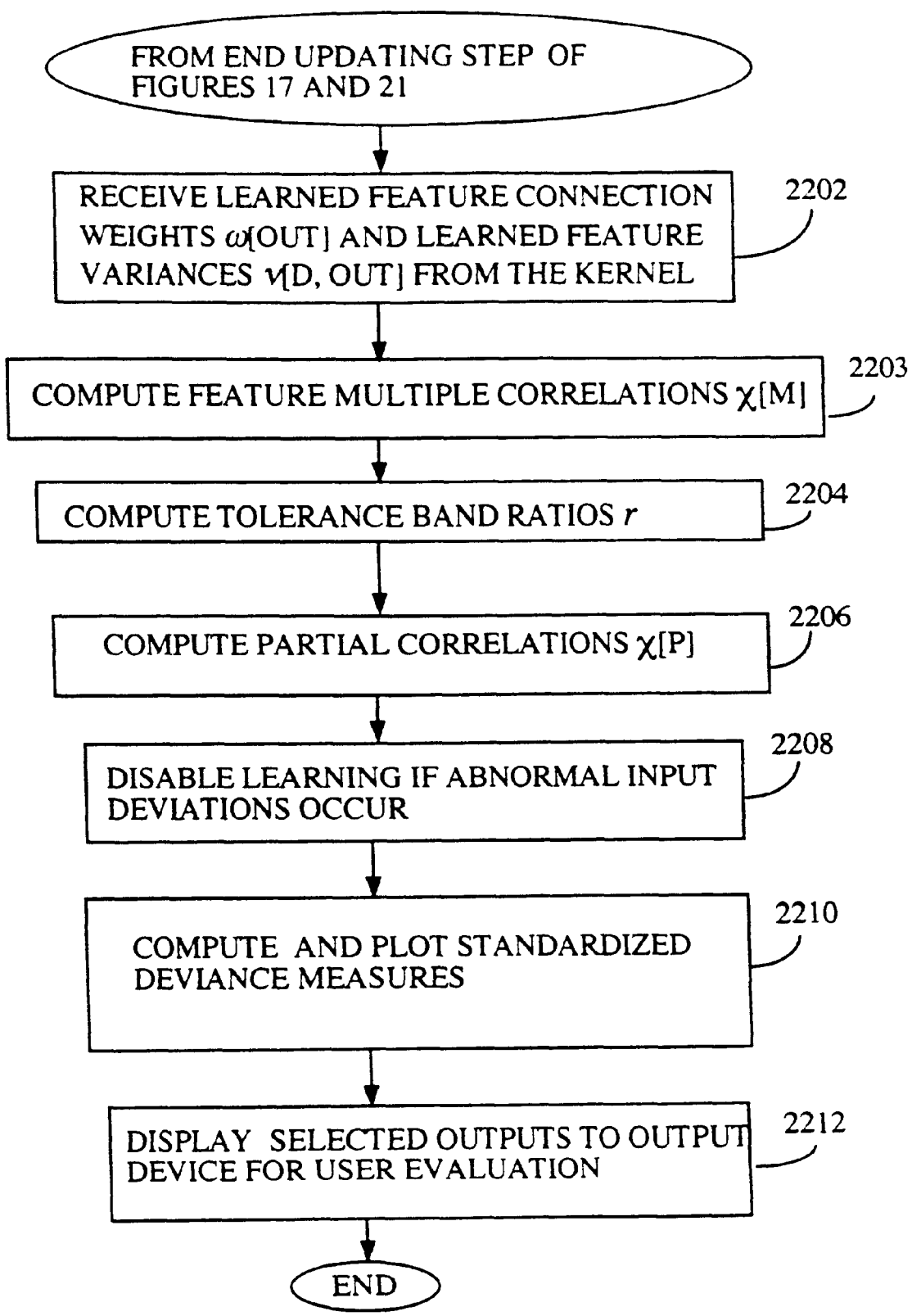

Referring to FIG. 22, processes of the preferred embodiment of the present invention for system monitoring are shown. At step 2202, the learned feature connection weights ω[OUT] and learned feature variances v[D,OUT] are received from the kernel. The process then proceeds to step 2203 to compute g feature multiple correlations c[M] according to Equation (23). Tolerance band ratios r are computed at step 2204 according to Equation (24). At step 2206, partial correlations are computed according to Equation (25). Additionally, because the CIP system monitors input deviations, at step 2208. learning may disabled if abnormal deviations are detected in system inputs, as discussed above. At step 2210, the Mahalanobis distance may be plotted to the output display monitor 14 and also the standard deviance measures may be calculated according to Equations (18) and (19) then displayed. According to user specifications, any desired output of the CIP system may be display at step 2212 for user evaluation.

The foregoing relates to the preferred embodiment of the present invention, and many changes may be made therein without departing from the scope of the invention as defined by the following claims.

I claim:

1. A parallel processing system for computing output values from input values received during a time trial, comprising:
   a plurality of processing units, each of said processing units operative to receive, during a time trial and in parallel, individual input values from an input vector, said processing units comprising analogs components for computing arithmetic operations of said system;
   a plurality of interconnected conductors, operative to connect each of said processing units to every other processing unit of said system and operative to transfer weighted values among said processors;
   a plurality of switching junctions located along said interconnected conductors, said switching junctions being operable for uniquely pairing each of said processors to every other processor of said system; and
   each of said processing units operative to provide, during said time trial, an expected output value based on said weighted values and each of said processing units operative to update, during said time trial, said weighted values based on said input values.

2. The system of claim 1 wherein analog components are operative to calculate values for updating said connection weights to transmitting to other processors of said system.

3. The system of claim 1 wherein said switching junctions comprise analog components for computing connection weight at said switching junctions.

4. The system of claim 1 wherein said switching junction have memory elements.

5. The system of claim 4 wherein said memory elements are resistive-capacitance elements.

6. The system of claim 1 wherein each of said conductors is a single wire conductor.

7. The system of claim 1 wherein said analog components receive input analog signals and produce an analog output having a magnitude corresponding to the magnitude of the inputs as operated on by the function associated with the analog component.

8. The apparatus of claim 3 further comprising a plurality of memory elements, each of said memory elements being individually coupled to a separate switching junction and each of said memory elements containing a weighted memory value.

9. A computer processing system for updating a matrix of elements for use in determining the relationship among a plurality of variables, comprising:
a plurality of processors, each of said processors operative to receive an input variable of a plurality of input variables in parallel received during a time trial;
an ordered array of memory elements associated with each processor, each of said memory elements defining elements of a matrix, each of said memory elements containing values that are operative to define a relationship among received input variables and each of said memory elements operative to be updated by each of said processors;
each of said processors operative to be uniquely paired with every other processor of said computer system;
said uniquely paired processors sharing data via a memory element associated with each unique pair of processors; and
each of said processors updating said memory elements to reflect the relationship among input variables received during a time trial.

10. The system of claim 9 wherein said memory elements contain values that represent a matrix inverse.

11. The system of claim 10 wherein said matrix inverse is an inverse of a matrix of second order derivatives.

12. The system of claim 11 wherein said matrix of elements are updated according to the equation:

$$\omega[DFP,OUT] = \omega[DFP,IN] - c[DFP]x[DFP]^T x[DFP] + b[DFP]y[DFP]^T y[DFP],$$

where $$c[DFP] = 1/d[DFP],$$

$$x[DFP] = e[DFP]\omega[DFP,IN],$$

$$d[DFP] = e[DFP]\omega[DFP,IN]e[DFP]^T$$

and $$b[DFP] = x[DFP]y[DFP]^T,$$

wherein said $\omega[DFP,IN]$, equals $\omega[DFP,OUT]$ from the previous measurement trial and wherein $\omega[DFP,IN]$ equals an initialization matrix before the first time trial.

13. The system of claim 12 wherein the inner product $C[DFP]x[DFP]^T x[DFP]$ is computed in a first step; and the inner product $b[DFP]y[DFP]^T y[DFP]$ is computed in a second step.

14. The system of claim 9 wherein said matrix of elements are updated according to the equation:

$$\omega[OUT] = (1+l)(\omega[IN] - cx^T x),$$

where $$c = l(1+l)/[1+l(1+l)d],$$

$$x = e[IN]\omega[IN]$$

and $$d = e[IN]\omega[IN]e[IN]^T = xe[IN]$$

wherein said $\omega[IN]$ equals $\omega[OUT]$ from the previous measurement trial and wherein $\omega[IN]$ equals an initialization matrix before the first time trial.

15. The system of claim 9 wherein said matrix is a connection weight matrix used for predicting outputs based on input variables received.

16. The system of claim 9 further comprising a plurality of switching junctions for uniquely pairing each of said processors to every other processor of said system.

17. The apparatus of claim 16 wherein each of said switching junctions selectively connects each of said processors to only one other of said processors during a time interval, thereby forming multiple paired sets of said processors, for communicating said weighted values during a time interval.

18. The apparatus of claim 17 wherein each of said memory elements is individually coupled to a separate switching junction.

19. The apparatus of claim 17 wherein said switching junctions successively connect different sets of multiple paired sets of said processors during multiple time intervals.

20. The system of claim 19 wherein said switching junctions successively connect all possible combinations of said different sets of multiple paired sets of said processors in a minimum number of steps.

21. A computer processing system for computing a matrix of elements, comprising:
a plurality of processing units, each of said processing units operative to receive, during a time trial and in parallel, individual input values from an input vector $e[IN]$;
an ordered array of memory elements associated with each processor, each of said memory elements defining elements of a symmetric matrix $\omega$;
each of said processors operative to be uniquely paired with every other processor of said computer system, thereby forming a processor pair $f$ and g;
said uniquely paired processors sharing data via a memory element uniquely associated with each unique pair of processors; and
each of said processors computing said memory elements during a time trial by multiplying said input vector $e[IN]$ by said symmetric matrix $\omega$.

22. The system of claim 21 further comprising a plurality of switching junctions for uniquely pairing each of said processors to every other processor of said system.

23. The apparatus of claim 22 wherein each of said switching junctions selectively connects each of said processors to only one other of said processors during a time interval, thereby forming multiple paired sets of said processors, for communicating said weighted values during a time interval.

24. The apparatus of claim 22 wherein each of said memory elements is individually coupled to a separate switching junction.

25. The apparatus of claim 22 wherein said switching junctions successively connect different sets of multiple paired sets of said processors during multiple time intervals.

26. The system of claim 25 wherein said switching junctions successively connect all possible combinations of said different sets of multiple paired sets of said processors in a minimum number of steps.

27. A computer processing system for modifying the elements $\omega\{f,f\}$ of a connection weight matrix used to produce an output based on inputs received during a time trial, comprising:
   a plurality of processing units, each of said processing units operative to receive, during a time trial and in parallel, individual input variables from an input vector $\omega<f>$;
   an ordered array of memory elements associated with each processor, each of said memory elements defining elements of a matrix $\omega<f,f>$, each of said memory elements containing values that are operative to define a relationship among received input variables and each of said memory elements operative to be modified by each of said processors;
   each of said processors operative to be uniquely paired with every other processor of said computer system;
   said uniquely paired processors sharing data via a memory element uniquely associated with each unique pair of processors; and
   each of said processors updating said memory elements to reflect the relationship among input variables received during a time trial.

28. The system of claim 27 wherein said matrix $\omega\{f,f\}$ is updated in parallel by said processors according to the following process $\omega\{f,f\}=\omega<f,f>-\omega<\omega>^T\omega<\omega>/\omega(f,f)$, where $\omega <f>$ represents an input vector, $f<f,f>$ is a symmetric matrix of memory elements, and $\omega(f,f)$ is a constant.

29. The system of claim 28 wherein said matrix of element is the inverse of a matrix.

30. The system of claim 27 further comprising a plurality of switching junctions for uniquely pairing each of said processors to every other processor of said system.

31. The apparatus of claim 30 wherein each of said switching junctions selectively connects each of said processors to only one other of said processors during a time interval, thereby forming multiple paired sets of said processors, for communicating weighted values during, a time interval.

32. The apparatus of claim 30 wherein each of said memory elements is individually coupled to a separate switching junction.

33. The apparatus of claim 30 wherein said switching junctions successively connect different sets of multiple paired sets of said processors during multiple time intervals.

34. The system of claim 33 wherein said switching junctions successively connect all possible combinations of said different sets of multiple paired sets of said processors in a minimum number of steps.

35. A computer processing system for updating a matrix of elements for use in determining the relationship among a plurality of variables, comprising:
   a plurality of processors, each of said processing units operative to receive, during a time trial and in parallel, individual input values from an input vector m[IN];
   a plurality of interconnected conductors, operative to connect each of said processing units to every other processing unit of said system and operative to transfer weighted values among said processors;
   a variance-covariance matrix of elements v associated with a processor, each of said memory elements being variance-covariance matrix values v defining elements of a matrix, each of said memory elements containing values that are operative to define a relationship among received input variables and each of said memory elements operative to be updated, by each of said processors, according to the equation:

$$v[OUT]=lm[IN]^Tm[IN]+v[IN]/(1+l),$$

where l is a learning weight; and wherein said matrix of elements is inverted for use in providing output values from said input values.

36. The system of claim 35 wherein each of said processors is operative to be uniquely paired with every other processor of said computer system; and
   said uniquely paired processors sharing data via a memory element uniquely associated with each unique pair of processors.

37. The system of claim 36 further comprising a plurality of switching junctions for uniquely pairing each of said processors to every other processor of said system.

38. The apparatus of claim 37 further comprising each of said switching junctions selectively connects each of said processors to only one other of said processors during a time interval, thereby forming multiple paired sets of said processors, for communicating said weighted values during a time interval.

39. The apparatus of claim 37 wherein each of said memory elements is individually coupled to a separate switching junction.

40. The apparatus of claim 37 wherein said switching junctions successively connect different sets of multiple paired sets of said processors during multiple time intervals.

41. The system of claim 40 wherein said switching junctions successively connect all possible combinations of said different sets of multiple paired sets of said processors in a minimum number of steps.

42. A method for updating a matrix of elements for use in determining the relationship among a plurality of variables in a computer processing system, comprising:
   receiving individual input values from an input vector m[IN]; and
   updating a variance-covariance matrix of elements v associated with a processor according to the equation:

$$v[OUT]=lm[IN]^Tm[IN]+v[IN]/(1+l),$$

where l is a learning weight,
   said elements being variance-covariance values v defining elements of a variance-covariance matrix v, each of said elements containing values that are operative to define the relationship among received input variables.

43. The method of claim 42 further comprising inverting said matrix of elements for use in providing output values from said input values.

44. A processing system for computing output values from input values received during a series of time trials, comprising:
   a processing unit operative to receive an input vector comprising a plurality of input data values for each time trial;

a memory unit, connected to the processing unit, containing elements defining a connection weight matrix that is the inverse of a covariance matrix based on regression analysis applied to input data values received during prior time trials;

said processing unit operative to provide, during each time trial, one or more output values calculated as a function of the input data values for the time trial and the elements of the connection weight matrix; and said processing unit operative to update the elements of the connection weight matrix, during each time trial, based on covariance relationships among the input values received during the time trial.

45. The processing system of claim 44, wherein the output values for each time trial correspond to a weighted sum of the input data values for the time trial, in which the weights are defined by the elements of the connection weight matrix.

46. The processing system of claim 44, wherein the processing unit is operative to access each element of the connection weight matrix in a sequential order.

47. The processing system of claim 44, wherein the processing unit is operative to access the elements of the connection weight matrix in parallel.

48. The processing system of claim 44, wherein the processing unit is operative to impute output values corresponding to missing input data values, during each time trial, based on the input data values for the time trial and the elements of the connection weight matrix.

49. The processing system of claim 44, wherein the processing unit is operative to impute output values corresponding to deviant input data values, during each time trial, based on the input data values for the time trial and the elements of the connection weight matrix.

50. The processing system of claim 44, wherein the input values correspond to measurements, and the output values correspond to expected values for the measurements.

51. The processing system of claim 44, wherein the processing unit updates each element of the connection weight matrix, for each time trial, using a learning weight reflecting a weight given to the input values for the time trial relative to weights given to corresponding input values for previous time trials.

52. The processing system of claim 51, further comprising a learning weight controller operative for changing the learning weight for each element of the connection weight matrix from time trial to time trial.

53. The processing system of claim 52, wherein the learning weight controller is operative for disabling learning in response to detecting abnormal deviation of input values.

54. The processing system of claim 52, wherein the learning weight controller is operative for receiving user inputs defining one or more of the learning weights.

55. The processing system of claim 44, further comprising a feature function controller for receiving measurements and computing the input vector based on the measurements.

56. The processing system of claim 55, wherein the feature function controller is operative for receiving user inputs defining values for the elements of the connection weight matrix.

57. The processing system of claim 56, wherein the connection weight matrix is initialized through the user defined values for the elements of the connection weight matrix.

58. The processing system of claim 55, wherein the feature function controller is operative for receiving output feature values from the processing unit and computing the output values based on the output feature values.

59. The processing system of claim 55, wherein the feature function controller is operative for computing statistics to identify sudden changes in input values.

60. The processing system of claim 55, wherein the feature function controller is operative for computing statistics to identify sudden changes in output values.

* * * * *